(12) United States Patent
Fox

(10) Patent No.: US 8,510,185 B2
(45) Date of Patent: Aug. 13, 2013

(54) SYSTEMS AND METHODS FOR OBTAINING AUTOMATED THIRD-PARTY AUDIT CONFIRMATIONS INCLUDING CLIENT PHYSICAL SIGNATURES, PIN ACCESS, AND MULTIPLE RESPONDERS

(75) Inventor: Charles Brian Fox, Nashville, TN (US)

(73) Assignee: Capital Confirmation, Inc., Brentwood, TN (US)

( * ) Notice: Subject to any disclaimer, the term of this patent is extended or adjusted under 35 U.S.C. 154(b) by 0 days.

(21) Appl. No.: 13/533,289

(22) Filed: Jun. 26, 2012

(65) Prior Publication Data

US 2012/0330798 A1 Dec. 27, 2012

Related U.S. Application Data

(60) Provisional application No. 61/501,646, filed on Jun. 27, 2011.

(51) Int. Cl.
*G06Q 40/00* (2012.01)

(52) U.S. Cl.
USPC ........... 705/30; 705/35; 705/38; 705/44; 707/999.104; 709/204

(58) Field of Classification Search
USPC .................. 705/30, 35, 38, 39, 44
See application file for complete search history.

(56) References Cited

U.S. PATENT DOCUMENTS

| 5,813,006 | A |   | 9/1998  | Polnerow et al. |
|-----------|---|---|---------|-----------------|
| 5,875,435 | A |   | 2/1999  | Brown |
| 5,966,698 | A | * | 10/1999 | Pollin ............... 705/34 |
| 6,029,146 | A |   | 2/2000  | Hawkins et al. |
| 6,058,375 | A |   | 5/2000  | Park |
| 6,185,683 | B1| * | 2/2001  | Ginter et al. ............... 713/176 |
| 6,192,348 | B1|   | 2/2001  | Mrva et al. |
| 6,246,999 | B1|   | 6/2001  | Riley et al. |
| 6,327,578 | B1|   | 12/2001 | Linehan |
| 6,330,545 | B1|   | 12/2001 | Suh |
| 6,601,175 | B1|   | 7/2003  | Arnold et al. |
| 6,640,307 | B2| * | 10/2003 | Viets et al. ............... 726/15 |
| 6,643,504 | B1|   | 11/2003 | Chow et al. |
| 6,714,944 | B1|   | 3/2004  | Shapiro et al. |
| 6,839,843 | B1|   | 1/2005  | Bacha et al. |

(Continued)

OTHER PUBLICATIONS

International Search Report in corresponding PCT Application PCT/US2012/044223, mailed Jan. 31, 2013, 10 pp.

*Primary Examiner* — Vanel Frenel
(74) *Attorney, Agent, or Firm* — Waddey & Patterson, P.C.; Mark J. Patterson; Mark A. Pitchford

(57) ABSTRACT

Systems and methods are defined for facilitating the audit process involving a business client, an auditor, and a third-party providing confirmations for the client upon the auditor's request. An auditor receives an audit number, electronically captured signature, or physical signature from the audited client as evidence of authorization for requesting confirmation from a third-party, such as a bank or related business entity. The confirmation request submitted by the auditor will be stored in a network-based computer system (i.e., confirmation system) and transmitted to the relevant third-party. The third-party responder then provides necessary confirmation response data or the confirmation system retrieves the response data from a computer of the responder using credentials of the client. The involved third-party can be a bank or financial institution, another entity in business relationship with the client, or any other entity that has access to the requested data associated with the client.

20 Claims, 34 Drawing Sheets

(56) References Cited

U.S. PATENT DOCUMENTS

| | | |
|---|---|---|
| 7,177,849 B2 | 2/2007 | Fieschi et al. |
| 7,383,232 B2 | 6/2008 | Fox |
| 7,562,040 B2 | 7/2009 | Loeper |
| 7,831,488 B2* | 11/2010 | Fox ................................ 705/30 |
| 7,945,489 B2* | 5/2011 | Weiss et al. ..................... 705/30 |
| 8,255,304 B1* | 8/2012 | Lorenzo .......................... 705/35 |
| 2001/0051902 A1* | 12/2001 | Messner ......................... 705/26 |
| 2002/0082965 A1 | 6/2002 | Loeper |
| 2004/0083148 A1 | 4/2004 | Chadrow |
| 2004/0205030 A1 | 10/2004 | Fox |
| 2005/0131818 A1 | 6/2005 | Desal et al. |
| 2008/0120210 A1* | 5/2008 | Leventhal ....................... 705/30 |
| 2010/0121767 A1 | 5/2010 | Coulter et al. |
| 2011/0125648 A1* | 5/2011 | Price et al. ..................... 705/50 |
| 2012/0158580 A1* | 6/2012 | Eram et al. ..................... 705/39 |

* cited by examiner

400

401

| Pending Reqs | Completed Reqs | Clients Reports | User Profile |

Confirmation Requests 411  412  413

Account Name    Number       Bank
☑ Technology Fund   2348756723   Demo Financial Bank
☑ Money Market III  34568675     Demo Financial Bank
☑ Money Market     234987658    Demo Financial Bank
☑ Payroll Fund     9878763411   Demo Financial Bank
☑ Fleet Loan       765278458    Demo Financial Bank
☑ Special Acct     76544908     Bank of Nashville

410

Sign-up New Client
Complete Client Audit

Enter your Request Date: ☐  —420

Enter your AUD: ☐  —430

Forgot you AUD? Click here to have a new AUD emailed to you.

SUBMIT    CLEAR FORM

Leadership
Careers
Press Room
Contact

Client Homepage

Confirmation

| Conf Requests | Accounts | User Profile |

New Account         (* denotes required field for Asset & Liability Accounts).

Select Bank
Bank*

Account Name*   Number*   Type*   Description

Due Date   Interest Paid Through

___ %
Interest

Collateral Description

ADD ACCOUNT    CLEAR FORM

Client Asset Report
Holladay, Ellen: Demo Audit Client
Request Date: 12/31/2002

| Account Name (1404) | Number (1406) | Balance (1408) | Interest Rate (1410) | Bank (1412) | Authorized Personnel (1414) |
|---|---|---|---|---|---|
| Trust Account | 123456789 | $1,750.00 | 1.2% | Demo Financial Bank | Anderson, Sylvianne |

Accountant Questions N/A
The information presented is in agreement with our records. Although we have not conducted a comprehensive, detailed search of our records, no other deposit or loan accounts have come to our attention except as noted.
Exceptions and/or Comments None to our knowledge.

| | | | | | |
|---|---|---|---|---|---|
| Sweep Account | 7686987987 | $55.99 | 1.2% | Demo Financial Bank | Anderson, Sylvianne |

Accountant Questions N/A
The information presented is in agreement with our records. Although we have not conducted a comprehensive, detailed search of our records, no other deposit or loan accounts have come to our attention except as noted.
Exceptions and/or Comments None to our knowledge.

| | | | | | |
|---|---|---|---|---|---|
| Checking | 09809876 | $100.00 | 1.2% | Demo Financial Bank | Anderson, Sylvianne |

Accountant Questions N/A
The information presented is in agreement with our records. Although we have not conducted a comprehensive, detailed search of our records, no other deposit or loan accounts have come to our attention except as noted.
Exceptions and/or Comments None

| | | | | | |
|---|---|---|---|---|---|
| Overnight Account | 266199615 | $100.00 | | Demo Financial Bank | Anderson, Sylvianne |

Accountant Questions N/A
The information presented is in agreement with our records. Although we have not conducted a comprehensive, detailed search of our records, no other deposit or loan accounts have come to our attention except as noted.
Exceptions and/or Comments None

| | | | | | |
|---|---|---|---|---|---|
| Trust Account | 123456789 | $145.00 | 1.1% | Demo Financial Bank | Anderson, Sylvianne |

Accountant Questions N/A
The information presented is in agreement with our records. Although we have not conducted a comprehensive, detailed search of our records, no other deposit or loan accounts have come to our attention except as noted.
Exceptions and/or Comments None

SYSTEMS AND METHODS FOR OBTAINING AUTOMATED THIRD-PARTY AUDIT CONFIRMATIONS INCLUDING CLIENT PHYSICAL SIGNATURES, PIN ACCESS, AND MULTIPLE RESPONDERS

CROSS-REFERENCES TO RELATED APPLICATIONS

This application claims benefit of the following patent application which is hereby incorporated by reference: U.S. Provisional Patent Application No. 61/501,646 filed Jun. 27, 2011, entitled "Systems and Methods for Obtaining Automated Third-Party Audit Confirmations Including Client Physical Signatures, Pin Access, and Multiple Responders."

A portion of the disclosure of this patent document contains material that is subject to copyright protection. The copyright owner has no objection to the reproduction of the patent document or the patent disclosure, as it appears in the U.S. Patent and Trademark Office patent file or records, but otherwise reserves all copyright rights whatsoever.

STATEMENT REGARDING FEDERALLY SPONSORED RESEARCH OR DEVELOPMENT

Not Applicable

REFERENCE TO SEQUENCE LISTING OR COMPUTER PROGRAM LISTING APPENDIX

Not Applicable

BACKGROUND OF THE INVENTION

The present invention pertains to systems, methods and computer program readable medium providing a secure electronic intermediary service between auditors and financial institutions to reduce time, resources, and costs necessary to complete third-party verifications.

Every year, public and private companies throughout the world have their financial statements audited. In the confirmation process of an audit, public accountants or auditors typically confirm with third parties items on the balance sheet and income statement. These include, but are not limited to: assets, debt, receivables, payables, investments and transaction details. This confirmation process is the one step still being completed using paper by accounting firms. The current practice is to send paper confirmations via the post office requiring the manually filling out paper-based confirmation forms. This is typically completed by the financial institution's clerk or the receiving company's staff, who then returns the paper confirmations by mail or fax to the auditor.

Today, the confirmation process comprises numerous manual steps. The confirmation process begins when the audited client or auditor fills out a paper confirmation request form supplied by the client's auditor. The current industry practice is to send paper confirmation request forms by mail, overnight delivery, or other like carriers. Once received by a financial institution, such as a bank, brokerage, or receiving company, the arriving mail is then privately sorted, hopefully routed to the appropriate department or departments, and usually dispatched to hired staff engaged in accommodating such requests. Once the confirmation is in proper hands, the task is generally viewed as a tedious process requiring manual, accurate, and prompt completion.

Financial institutions vary in how they process confirmation, though larger financial institutions have one or more centers devoted solely to processing confirmations. Additional costs are incurred during certain periodic business cycles (e.g., end of year) when the employees work overtime and/or employ temporary staffing to meet the demand of answering confirmations.

Currently, when the manual paper confirmation process works optimally (60% to 80% of the time), it takes a minimum of 2 to 3 weeks to complete. When there are complications (reported 20% to 40% of the time), such as incorrect statement date, incorrect account balances, or no response to the request for confirmation, etc., the process can take up to 4 to 6 weeks to complete. Invariably, with such complications, the costs are increased to the financial institutions, accounting firms, and the client being audited increase.

Today, many accounting firms perform portions of the audit process using electronic communications, except that third-party confirmations remain paper-based. Many accounting firms that have not adopted the paperless process are also now moving to a paperless audit, barring the one process (e.g., confirmations) that is still performed manually using paper. This step includes the confirmation of items include the assets, debt, investments, receivables, payable, and transaction details. Consequently, there is a need to further reduce costs associated with auditing by automating the step of confirming cash, receivables, and payables balances.

The paper-based confirmation process of confirming information leaves an opening for fraud, thus creating increased liability for the auditor. For instance, in the current paper confirmation process, most accountants ask the client to fill out the paper confirmation form, or ask the client for the mailing address and contact name for where and to whom the confirmation should be sent. The auditor then mails that confirmation to the financial institution to be filled out. The auditor typically abides to certain procedures in sending out that confirmation.

First, confirmations usually cannot be mailed out from or faxed back to the client's office. This is to protect the integrity of the confirmation process. The auditor cannot give the client access to the confirmations after the client has filled out the form for fear the client may intercept them and alter the information. This can pose a problem if the auditor's office is not in the same city or even the same building as their client. If the confirmations are mailed back from the financial institution to the auditor's office, the auditor must either go back to his or her office to retrieve them, or have someone in the office forward the confirmations via mail to the auditor's hotel or designated location. If the confirmations are faxed back from the financial institution, the auditor must either stand by the fax machine waiting on the financial institution to fax them back so the auditor can witness the confirmations as they are received over the fax machine, or the auditor must use an off-site fax machine, at an independent copy center. Such centers typically charge for this service adding additional cost to the audit process.

Second, the auditor is usually not allowed to send confirmations to a post office box for fear the post office box is not really the financial institution's address, but rather a third-party who is attempting to defraud the company or auditor.

Additionally, the conventional confirmation process is subject to other fraudulent practices. Currently, in the conventional process the auditor instructs the client to fill out the paper confirmation before it is sent for confirmation. This includes directing the client to fill out the proper financial institution address. Most accountants rely solely on the client for this information and do not employ any system for countering incorrect information supplied by the client. As it stands now, the client, in an effort to deceive the auditor, could use any erroneous address, which would suggest legitimacy, as long as it is not addressed to a post office box. The auditor may then, unknowingly send the confirmation to the client's own house, erroneous address, friend or relative thus perpetuating and facilitating fraud. The lack of checks and balances in the current process allows for an information imbalance thus creating a liability for the auditor. There is no timely or convenient mechanism to ensure that the address on the confirmation is a valid address, nor is it practical for accountants to verify the information themselves.

Thus, there is a need for third-party confirmations to be performed in a timelier manner so as to facilitate the whole auditing process. In addition, there is a need for a more secure method that prevents fraud in third party confirmations.

In conjunction with the use of automated confirmations and auditing processes, there is also a need for methods for obtaining electronic or physical signatures from audited clients, for pulling data from responders using a client signature and/or a PIN assigned to the client, electronically responding to paper confirmation requests using an electronic signature captured from the client and/or a PIN assigned to the client; and electronically responding to paper confirmation requests after the client signs the paper request.

BRIEF SUMMARY OF THE INVENTION

According to one aspect of the present invention, a method is disclosed for facilitating auditing comprising storing an audit number in a computer system, receiving identification data from a user, testing the identification data with verification data to authorize the user to further access the computer system, receiving the audit number from the user, testing the audit number to determine it is valid, receiving a confirmation request from the user, indicating the confirmation request to a third party, receiving response data from the third party including account balance data and a date, receiving a request from the user for the response data, providing the response data to the user.

According to another aspect of the invention, a system is disclosed that comprises a database storing first verification data for a first user and second verification data for a second user; and a server operatively connected to the database, the server configured to receive first identification data from the first user and compare it with the first verification data, the server configured to receive a confirmation request from the first user, the confirmation request comprising an audit number, account identification data, and a date; the server further configured to store the confirmation request, the server further configured to receive second identification data from a second user and compare the second identification data with a second verification data, the server further configured to indicate to the second user the confirmation request, the server further configured to receive response data from the second user, the server further configured to store the response data in the database, the server further configures to receive a request from the first user for the response data, and the server further configured to indicate the response data to the second user.

In accordance another embodiment of the invention, a computer readable medium is disclosed that when executed, performs the steps of receiving input from a first user comprising identification data; comparing the identification data with verification data stored in a database; receiving a second input from the first user comprising an audit number and a confirmation request associated with an audited client; receiving confirmation data in reply to the confirmation request from a third-party, the confirmation data comprising account type data, account identification data, account balance data, and a date associated with the account balance data; and presenting the confirmation data to the first user.

In accordance with a further embodiment, a method for obtaining a physical signature from an audited client is disclosed, such method including the following steps: (a) a requestor logs in to the system, inputs client account data into the audit confirmation system, and makes a request for confirmation to a responder; (b) the client logs in to the system and approves the confirmation request by signing using a form of electronic signature capture; (c) in some embodiments, the system operator processes a credit card for payment; (d) the responder logs in to the system, inputs client response data, and approves the confirmation response; (e) the requestor logs in to the system and downloads the completed confirmation; and (f) in some embodiments, the responder auditor logs in to view responder's response.

BRIEF DESCRIPTION OF THE SEVERAL VIEWS OF THE DRAWINGS

FIG. 4 is an exemplary representation of an initiate-confirmation-requests screen of a computer system for third-party confirmations according to one embodiment of the present invention.

FIG. 6 is an exemplary representation of an account display screen image of a computer system for third-party confirmations according to one embodiment of the present invention.

FIGS. 10a-c provide exemplary representations of a series of display screen images for viewing and purchasing completed confirmation requests of a computer system for third-party confirmations according to one embodiment of the present invention.

FIG. 14 is an exemplary representation of a screen display image indicating a client report comprising third-party confirmations according to one embodiment of the present invention.

FIG. 17 is an exemplary representation of a display screen image accessible to a bank user for confirming, denying or holding a pending confirmation request according to one embodiment of the present invention.

DETAILED DESCRIPTION OF THE INVENTION

Figure 1:
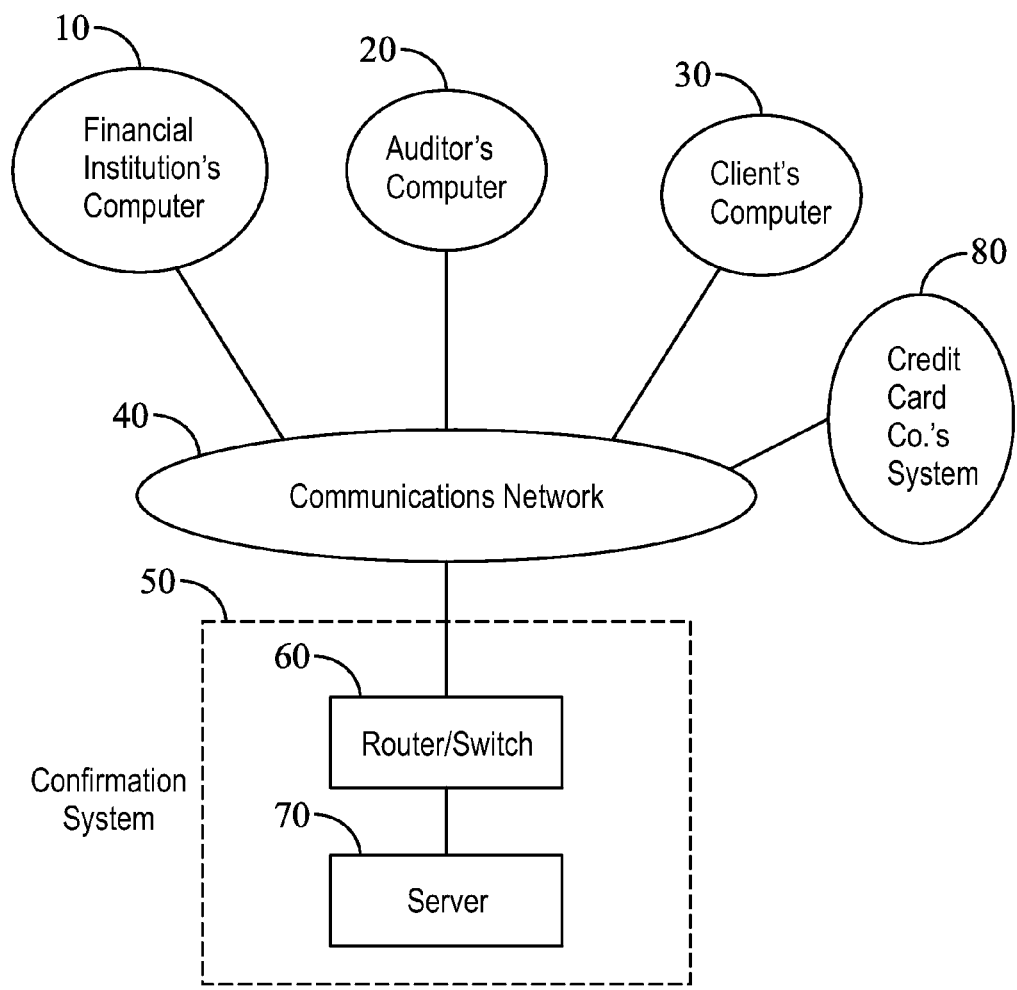
FIG. 1 illustrates the architecture of the various systems interacting with the confirmation system according to one embodiment of the present invention.

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

The present invention is described below with reference to block diagrams and flowchart illustrations of methods, apparatus (i.e., systems) and computer program products according to an embodiment of the invention. It will be understood that each block of the block diagrams and the flowchart illustrations, and combinations of blocks in the block diagrams and combinations of the blocks in the flowchart illustrations, can be implemented by computer program instructions. These computer program instructions may be loaded onto a general purpose computer, special purpose computer, or other programmable data processing apparatus to produce a machine, such that the instructions that execute on the computer or other programmable data processing apparatus create means for implementing the functions specified in the block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function specified in the block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the block or blocks of the flowchart, or clock or blocks of the diagrams.

Accordingly, blocks of the block diagrams and the flowchart illustrations support combinations of means for performing the specified functions, combinations of steps for performing the specified functions and program instruction means for performing the specified functions. It will also be understood that each block of the block diagrams and the flowchart illustrations, and combinations of the respective blocks, can be implemented by special purpose hardware-based computer systems which perform the specified functions or steps, or combinations of special purpose hardware and computer instructions.

Further, the terms "financial institution", "auditor", "client" are used and based on the context, may refer to a computer system operated by the entity, a user, a person affiliated with the entity operating the computer system, or the entity in general. It should be clear from the context the appropriate meaning to be applied. Further, the term "auditor" is frequently also called an "accountant" and the terms are intended to be interchangeable. Further, although the principles of the present invention are illustrated using an "auditor", this is not limited to an accountant. In a broad sense, any user requesting confirmation of information can be viewed as an "auditor." The information to be confirmed is not limited to accounting parameters or accounting functions. For example, any type of information may be confirmed, including the disposition of a physical asset, type or identification of an account, status or disposition of an application for a loan or mortgage, debt or investment terms, receivable or payable balance and party associated with, collateral description, name of a signatory of a particular document, tax status, presence and amount of a lien, levied taxes, alimony payments, debt balance, escrow related parameters, investment related data, personal information (e.g., social security number, name, birthday, driver's license number, mother's maiden name), name on or associated with an account, employment history, health care records (surgical records, payment history, medication currently prescribed), judicial records (status of convictions, fines, or judgments entered against) or any other business, financial, medical, health, credit, or personal data subject confirmation in the course of business by another party. Similarly, though the illustrative embodiments are described in terms of a "bank" as one example of a third-party user providing confirmation information, other types of financial institutions, non-financial institutions, charities, non-governmental organizations, agencies, or governmental organizations as users providing confirmation responses are possible.

FIG. 1 illustrates one embodiment of the architecture and typical user entities that may interact with the confirmation system 50 in order to achieve the automated third-party confirmations. As seen in FIG. 1, a confirmation system 50 comprises a server 70 operatively connected to a communications network 40 via a router/switch 60 or other type of network interface. The entities accessing and interacting with the confirmation system 50 include a financial institution's computer 10, an auditor's computer 20 and a client's computer 30 according to one embodiment of the present invention. The financial institution 10 represents one type of a third-party user to which a confirmation is being sought by the auditor. The third-party user can include, but is not limited to, all types of banks, financial service companies, corporations, and credit unions. Further, this could be an independent business entity, government entity or any other type of entity providing confirmation data for the audited client entity.

The auditor 20 is an accountant or other individual performing the audit. The auditor is the primary entity that requests confirmations from a third-party, such as the financial institution 10. The client 30 is the entity subject to audits, including, but not limited to, any business, corporation, non-profit organization, government department or any other entity being audited.

In one preferred embodiment of the present invention, all these user entities have access to the confirmation system 50 via the communications network 40, which can be the Internet, a local area network, a wide area network or a concatenation of various types of communications networks. The confirmation system 50 may be operated by an independent service provider or may be affiliated with a financial institution or auditor. In some embodiments, certain users accessing the confirmation system may be charged for certain fees that may be paid electronically through a credit card company 80. Alternative embodiments are possible, such as directly debiting an account associated with the purchaser. If paid for by a credit card, the credit card company 80 would interact with the system 50 via the communications network 40. Alternatively, the confirmation system 50 can be a client application embedded in one of the other individual user entity's existing system. For example, the confirmation system 50 can be integrated into a banking system run by the financial institution 10. In that way, for the bank user 10, the confirmation data exchange is accomplished through internal communications between different application modules.

Although FIG. 1 illustrates the router/switch 60 as being a separate entity from the server 70, in other embodiments, the router/switch 60 functionality may be integrated in the communications network 40 or incorporated in part into the server 70. Thus, in various embodiments, the confirmation system 50 may comprise a server 70 but itself without a separate router/switch 60.

Figure 1A:
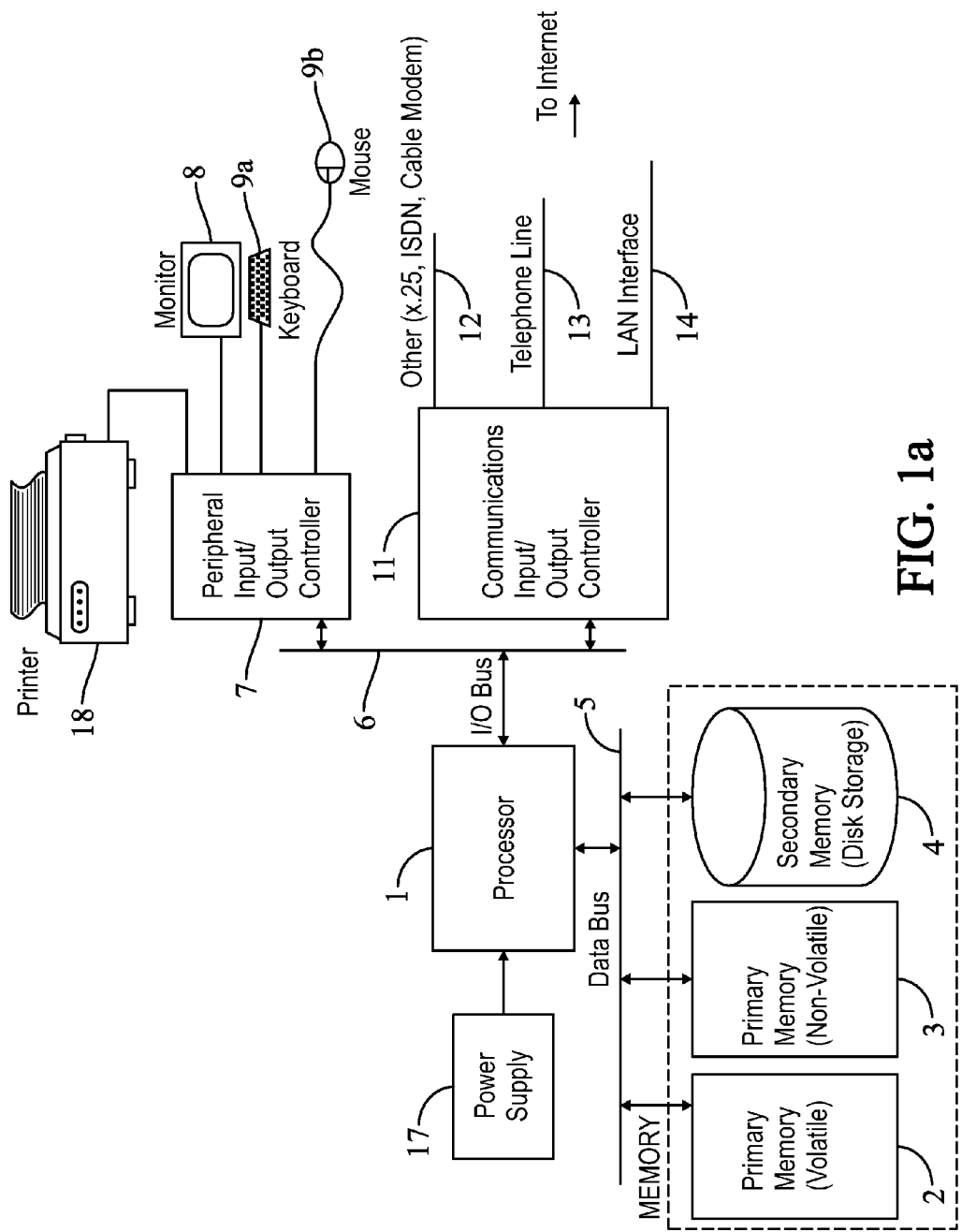
FIG. 1a illustrates one embodiment of the architecture of the confirmation system according to the principles of the present invention.

A typical embodiment of the server for executing software providing confirmation servers is shown in FIG. 1a. Alternatively, or in addition, FIG. 1a illustrates a typical embodiment of a client computer 30, auditor's computer 20, or financial institution computer 10 that may execute the software.

Turning to FIG. 1a, one embodiment of the server 70 is illustrated that may comprise a computer used to practice aspects of the present invention. The same computer architecture could apply to either of the auditor's or financial institution's computer if the application is executed on those computers. In FIG. 1a, a processor 1, such as a microprocessor, is used to execute software instructions for carrying out the defined steps. The processor receives power from a power supply 17 that also provides power to the other components as necessary. The processor 1 communicates using a data bus 5 that is typically 16 or 32 bits wide (e.g., in parallel). Typical applications involve the processor receiving inputs, such as user input in the form of various numerical identifiers that are stored in the memory using the data bus. The data bus 5 is also used to convey data and program instructions, typically, between the processor and memory. In the present embodiment, memory can be considered primary memory 2 that is RAM or other forms which retain the contents only during operation, or it may be non-volatile 3, such as ROM, EPROM, EEPROM, FLASH, or other types of memory that retain the memory contents at all times. The memory could also be secondary memory 4, such as disk storage, that stores large amount of data. In some embodiments, the disk storage may communicate with the processor using a bus 6 instead or a dedicated bus (not shown). The secondary memory may be a floppy disk, hard disk, compact disk, DVD, or any other type of mass storage type known to those skilled in the computer arts.

The processor 1 also communicates with various peripherals or external devices using an I/O bus 6. In the present embodiment, a peripheral I/O controller 7 is used to provide standard interfaces, such as RS-232, RS422, DIN, USB, or other interfaces as appropriate to interface various input/output devices. Typical input/output devices include local printers 18, a monitor 8, input devices such as keyboard. 9a and a mouse 9b or other typical pointing devices (e.g., roller ball, track pad, joystick, etc.) that are not shown.

The processor 1 typically also communicates using a communications I/O controller 11 with external communication networks, and may use a variety of interfaces such as data communication oriented protocols 12 such as X.25, ISDN, DSL, cable modems, etc. The communications controller 11 may also incorporate a modem (not shown) for interfacing and communicating with a standard telephone line 13. Finally, the communications I/O controller may incorporate an Ethernet interface 14 for communicating over a LAN. Any of these interfaces may be used to access the Internet, intranets, LANs, or other data communication facilities. The communications 10 is used by the processor to send data, such as account data or other data comprising a confirmation request response data, as well as receive confirmation requests from a user.

Figure 1B:
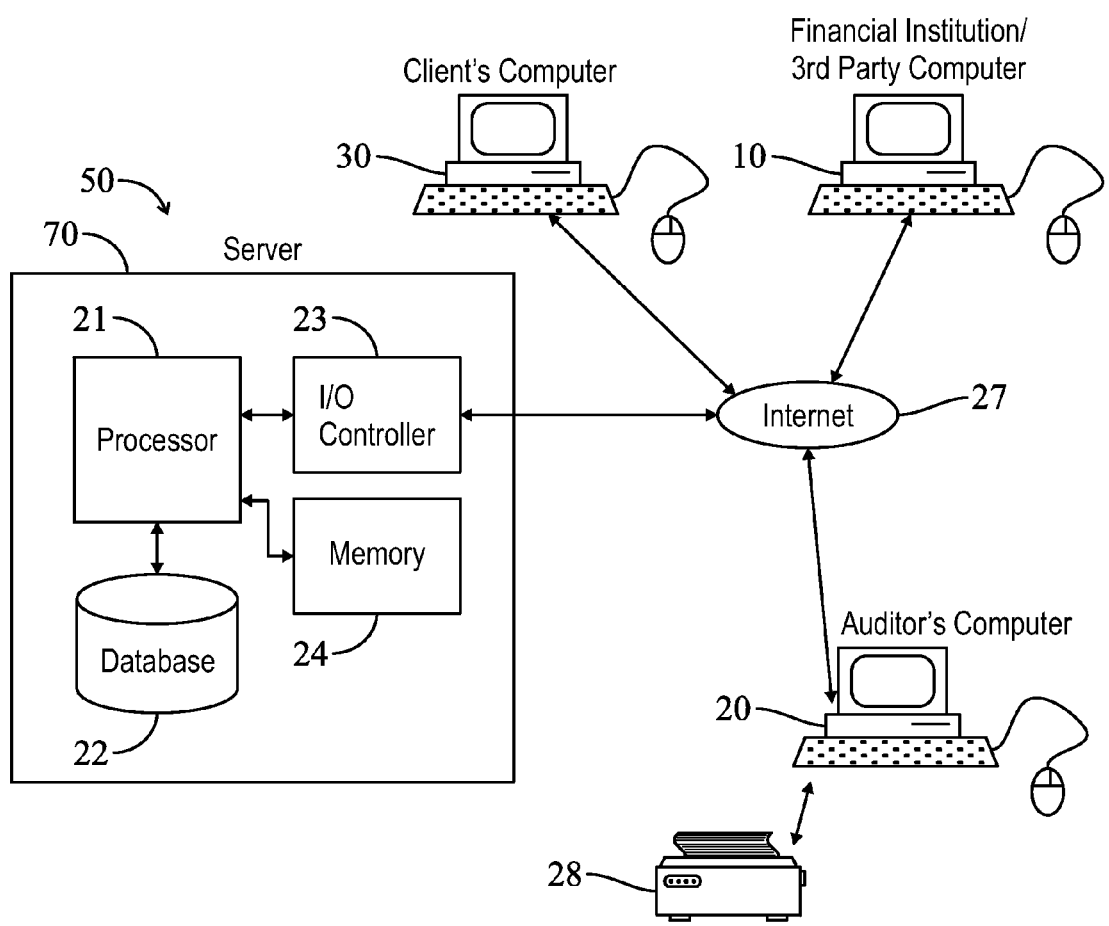
FIG. 1b illustrates another embodiment of the architecture of the confirmation system according to the principles of the present invention.

An alternative embodiment of a processing system than may be used is shown in FIG. 1b. In this embodiment, the confirmation system 50 comprises a server 70 communicating with a client computer 30, financial institution computer 10, and the auditor's computer 20. In other embodiments, only a subset of the computers may be involved. The server 70 typically comprises a processor 21 that communicates with a database 22, which can be viewed as a form of secondary memory and stores various confirmation requests, both pending and completed, as well as primary memory 24. The processor also communicates with external devices using an I/O controller 23 that typically interfaces with the Internet 27.

In this embodiment, each of the client's computer 30, financial institution's computer 10, and the auditor's computer 20 incorporate a browser, such as the Microsoft Explorer" executing on a Windows 2000™ operating system. The server 70 may utilize standard Internet protocols, such as HTTP, or secure encryption protocols, like HTTPS or other types of both secure and non-secure communication protocols as is known in the art, for communicating data, such as response data and soliciting confirmation request data from a user. Further, the auditor's computer may include a local printer 28 for printing local reports in order to provide a written record of the confirmation results or other data as described herein.

Those skilled in the art of data networking will realize that many other alternatives and architectures are possible and can be used to practice the principles of the present invention. The embodiments illustrated in FIGS. 1a and 1b can be modified in different ways and be within the scope of the present invention as claimed.

Figure 2:
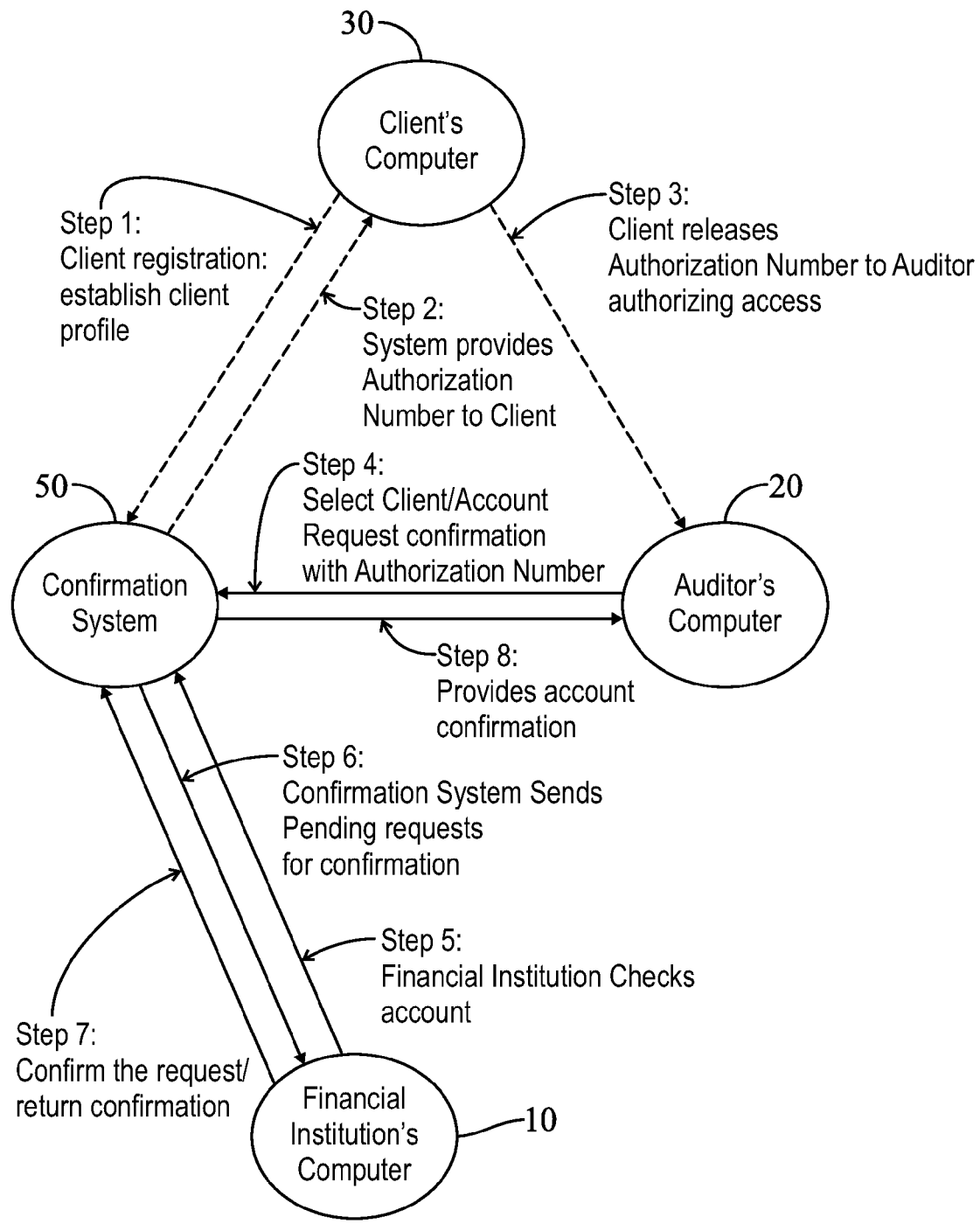
FIG. 2 is a high-level block and process flow diagram of a computer system for third-party confirmations according to one embodiment of the present invention.

Turning to FIG. 2, a high-level block and process flow diagram of the interaction between the various aforementioned entities is demonstrated with exemplary steps. Using a financial institution as an example of the third-party providing confirmations, FIG. 2 represents the step-by-step confirmation process in accordance with one embodiment of the present invention. The first step is to have the client's computer 30 register with the confirmation system 50. Specifically, in Step 1, the client establishes an account with the confirmation system 50 by providing necessary data including company information (name, address, phone number, email, etc.), account related information (name, address, phone number and email) of the accounting firm authorized for auditing the client 30), and account related information (such as the name, address, phone number and email of one or more banks/financial institutions where the client has accounts to be audited). This is illustrated as a dotted line in FIG. 2, since in some embodiments, this step may occur manually, without client computer communicated electronically with the confirmation system. Thus, in one embodiment the client user may user the client's computer to provide the data to the confirmation system at the prompting of the confirmation system. In other embodiments, the client user may interact with a person associated with the confirmation system and providing the information manually or verbally. In either case, various input means can be used to provide the data to the confirmation system so that it is stored in memory in an organized and retrievable manner.

The confirmation system 50 stores such client-provided data into a database, and in turn, in Step 2 provides the client's computer 30 with login information, i.e., username and password for secure access to the confirmation system 50. The login information may be communicated to the client's computer 30 via an email sent from the system 50. This step is illustrated as a dotted line in FIG. 2 since alternatively, the login information may be generated by a letter sent via postal mail, communicated via a telephone call, or any other means for secure data transfer. The information could be communicated person-to-person, and does not require automated computer communication. Second, client authorizes the release of the information from the financial institution to the auditor using an AUD number (audit number) or other form of electronic signature as is known in the art. In this embodiment of the system, the confirmation system 50 generates an audit number, which can be an authorization number, PIN (personal identification number), or other form of alphanumeric data and transmits the audit number to the client 30, typically via email communication. The audit number functions similar to a key in that it allows access or authorizes, in part, information associated with the client. Only when the client 30 gives the audit number to the auditor 20 is the auditor 20 authorized to access the account confirmation information of the client 30, such as those provided as response data from a third-party such as the bank/financial institution 10 in this illustrative example. The communication shown in step 3 is indicated as a dotted line again that the communication may occur in a variety of ways, and does not necessarily involve electronic communication between the confirmation system and another computer. For security purposes, the confirmation system 50 typically recognizes an audit number as being valid for a limited time (e.g., after 30 days from the time the number is generated, or after the number has been used for a certain number of times, (e.g., three times), or upon a request for cancellation from the client 30). If the audit number is no longer valid, then a new number can be requested by the client and generated by the confirmation system. The system typically sends the number to the client, who in turn, may send it to the auditor. In other embodiments, the client may authorize the confirmation system to send the number to the auditor directly.

After receiving the audit authorization number from the client 30, the auditor 20 can initiate a confirmation request as shown in Step 4. More specifically, the auditor 20 is required to select or identify an account of the client 30 that is associated with the financial institution 10 to which the confirmation request is directed. In addition, the auditor 20 provides the audit authorization number for validation by the system 50. Further, the confirmation request typically includes a date for which account confirmation information is to be associated with (e.g., the account balance for an indicated account as of the end of the indicated date). The indicate date is may be a past date, a current date, or a future date.

In the embodiment shown in FIG. 2, the confirmation system 50 now has received and stored into memory pending confirmation requests that need to be acted upon by the appropriate financial institution. In one variation, the confirmation system could "push" the pending confirmation request to the financial institution's computers, or alternatively electronically notify the financial institution that a confirmation request is pending. In another variation, the financial institution "pulls" the confirmation request from the confirmation system. This embodiment is can be practiced, for example, by a employee of the financial institution (e.g., bank clerk) logging onto the confirmation system in Step 5, entering the appropriate identification and authorization information, to which the confirmation system responds in Step 6 with a list of pending confirmation requests.

After receipt of the pending confirmation request, the bank clerk then retrieves from the bank's own databases (not shown) the account data associated with the client 30 on the specified historical date. This can be done manually, or on an automated basis.

The financial institution 10 confirms the request by providing the appropriate confirmation data in Step 7. The data is communicated by sending the retrieved account data to the confirmation system 50. Such account data, typically, comprises how much cash balance remain in an account of the client 30 and potentially other information. Additionally, the bank clerk may provide identification and/or contact information allowing identification of the person providing the response data. If the auditor 20 provides any incorrect input associated with the confirmation request such as incorrectly identifying the account or providing an invalid date, the response provided by the financial institution in Step 7 will indicate a denial with specific reasons.

Regardless of the nature of the response from the financial institution, the confirmation system 50 stores the response from the financial institution 10 in its database, including account data of the client 10 or denial reasons.

The confirmation system 50 then provides the response in Step 8 to the auditor. However, because the overall interaction between the various users and/or computers may not be in real time, it may be inconvenient for the auditor to wait for the response while being logged onto the confirmation system. Thus, the auditor may log-off, and at a future time log-on again to check whether the confirmation response is available. A similar paradigm for the auditor "pulling" data from the confirmation system or the confirmation system "pushing" the data to the auditor can be defined. Thus, the confirmation system may notify the auditor of an answered confirmation request (e.g., response pending) or the auditor may periodically log on and check the status.

In one embodiment, the confirmation system solicits payment information from the auditor prior to disclosing the confirmation response data to the auditor. This requires the auditor 20 to provide necessary payment information (e.g., credit card information) before receiving the confirmation result from the confirmation system 50. After payment has been made, the confirmation result is said to be "purchased" by the auditor. Thus, the confirmation result is called a "purchased confirmation." In other embodiments, various electronic wallets, "Pay pal" services, debit cards, or direct electronic funds transfer may be employed to effect payment.

FIG. 2 only represents one embodiment of the present invention wherein the involved third-party is a bank or financial institution. A person of ordinary skills in the art would readily appreciate that the work flow as shown in FIG. 2 and associated variations may well apply to a variety of contexts where the third-party providing confirmations can be another corporate entity doing business with the client 30, namely a government entity, a charitable organization, etc.

In the following paragraphs, more specific functions and interactions of each user entity with the confirmation system 50 is disclosed, namely, the client 30, the auditor 20 and the bank 10, will be described with reference to the FIGS. 3-17 illustrating exemplary flow charts and display screens representing web pages presented to various users accessing the confirmation system.

Client Functions and Interactions

Figure 3:
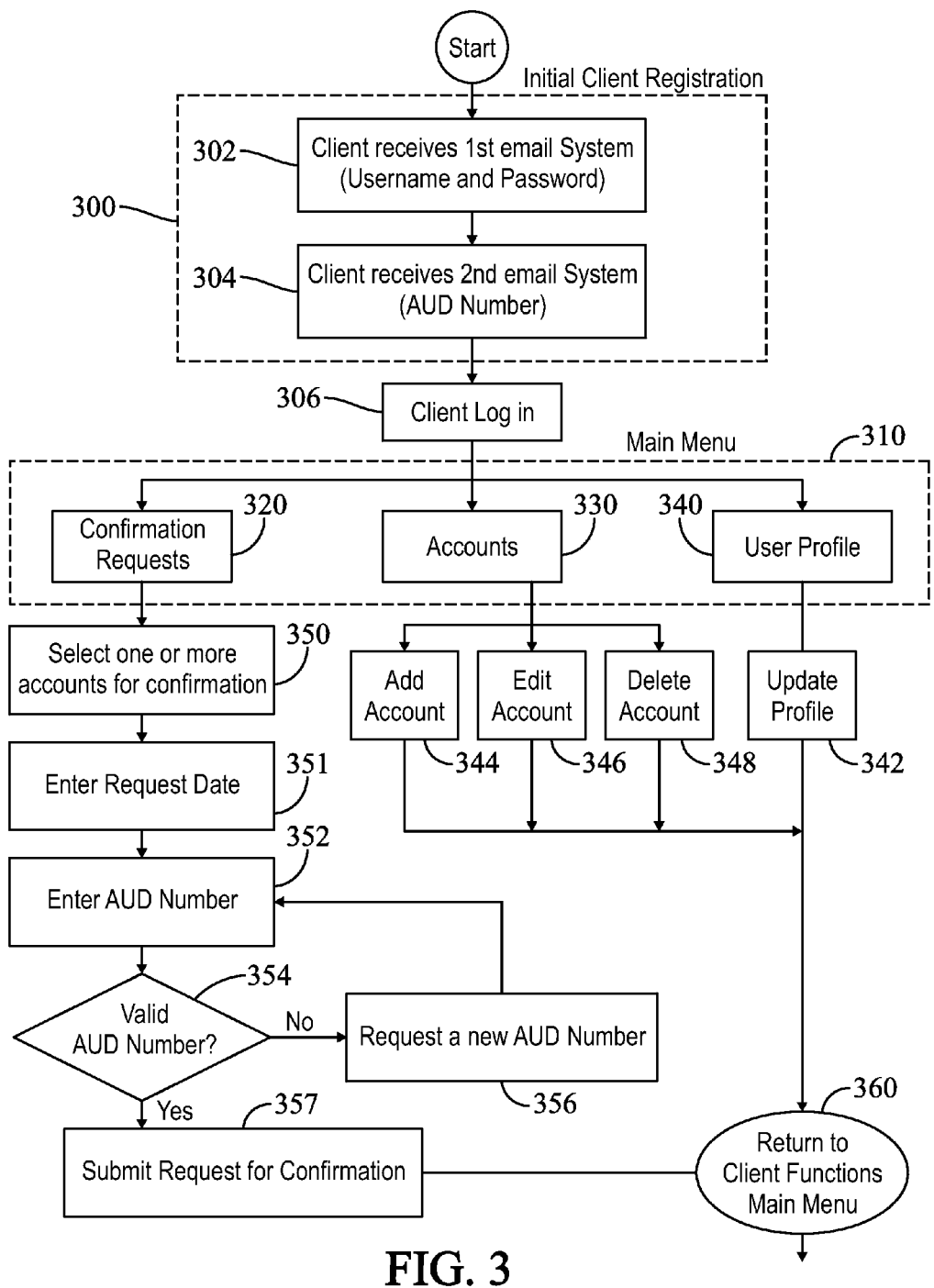
FIG. 3 is a work flow diagram of a client user of a computer system for third-party confirmations according to one embodiment of the present invention.

As shown in FIG. 3, the interactions between the client 30 and the confirmation system start with the initial client registration 300. This may occur by electronic communication between the client's computer and the confirmation system, or the operator of the confirmation system may enter into the confirmation system the necessary client information. After the client 30 provides necessary information for establishing a profile in the confirmation system (not shown), the client receives, preferably, an email from the system in step 302 containing typically a username and password that is used by the client to access and log into the confirmation system. Although the present embodiment illustrates using a user-name and password, other forms of separate or integrated identification and authorization mechanisms, such as electronic signatures may be used to gain access by the user (whether client, auditor or otherwise) to the confirmation system. The confirmation system proceeds to send to the client a second email containing an audit authorization number 304 for it to authorize the auditor to request third-party confirmations. As mentioned above, the audit number provided in step 304 will be typically invalidated and re-generated periodically. Alternatively, the client may request regeneration of a new audit number, which can be accomplished by the confirmation system 50 sending out an email to the auditor including the new audit number.

In the next step, the client logs into the confirmation system at step 306 by providing the received username and password 302 through a web page with these fields to be filled in. Once the confirmation system determines the username and password provided by the client are correct and the client functions in a main menu 310 are displayed. The client functions or main menu typically comprise Confirmation. Requests 320, Accounts 330 and User Profile 340.

Confirmation Request Menu Function

The Confirmation Request menu function is associated requesting confirmation for an identified account. While this is primarily a function used by auditors, this function is also available for the client to invoke. The process steps include selecting or identifying the account for which a confirmation is requested in step 350, providing the desired date for which the account is to be confirmed in step 351. Next, the audit number is provided in step 352. In step 354, the confirmation system processor compares the audit number entered by the user with audit number stored in memory to determine if the number is valid. If so, then a request is submitted for confirmation in step 357. At this point, the confirmation stores the pending request in its database. If the audit number is not valid in step 354 (e.g., it has expired), a new audit number must be requested in step 356 and proceeds again at step 352.

A sample screen display representing one embodiment of the Confirmation Request 320 menu function is shown in FIG. 4. In FIG. 4, the sample screen display 401 allows the user to indicate or select one or more accounts 410 for submitting a confirmation request 400. Each account 410 comprises an account name 411, an account number 412 and a bank 413 where the account 410 resides. Typically, each line corresponds to one record in the confirmation system database. The user is required to enter a request date 420, which sets a time limitation associated with the confirmation request 400. Specifically, in one embodiment the date indicates the date for which the account confirmation data is to be valid. The client is also required to enter a valid. AUD number 430. If the audit number 304 provided by the confirmation system has been invalidated in accordance with one of a set of predetermined rules (e.g., 30-day expiration, three-times-of-use limit prior to expiration, explicit termination by the client), the client may click an icon 440 for requesting a new valid audit number to be sent by the confirmation system. With one or more accounts 410 selected, request date 410 and valid AUD number 430 entered, the client can click an icon 450 to submit the confirmation request 400 to the confirmation system. The confirmation system will, store the data in its database and flag the request as a pending confirmation request.

As will be described below, the confirmation system will display the request 400 to the bank user as a pending confirmation request when the bank user logs in and checks for pending confirmation requests. As previously described, other techniques for "pushing" the notification to the bank user may be employed.

User Profile Menu Function

Figure 5:
FIG. 5 is an exemplary representation of a client profile display screen image of a computer system for third-party confirmations according to one embodiment of the present invention.

The main menu for the client in FIG. 3 also allows a user to select the User Profile function 340. This function allows the client to administer various client related information, including identification and contact information. This allows the client user to update records pertaining to the client stored in the database of the confirmation system. In FIG. 5, one embodiment of a screen display image associated with this user function is illustrated. Turning to FIG. 5, the screen display 501 includes Client Information 500 comprising name information 502, including First Name, Last Name and Contact title of a contact person, Company Name. Also provided is contact information, such as phone number 503, e-mail address, fax, address, Website information, etc. The client may edit the Client Information 500 and click the "Update Profile" icon 510 to keep the user profile updated in the database of the system.

Accounts Menu Function

The main menu 310 of FIG. 3 also allows a user to select the "Accounts" function 340, One embodiment of the "Account" display screen 601 is disclosed in FIG. 6. The function of the "Account" option is to allow the client to add, edit and delete any account information. When adding a new account 600, the client should select a bank, by providing data including account name, account number, account type (i.e., asset or liability), description of the account, due date, year which interest paid through, interest rate, and collateral description. By clicking the "ADD ACCOUNT" icon 610, the client may create a new account that will be stored into the database of the confirmation system.

Auditor Functions and Interactions

Figure 7A:
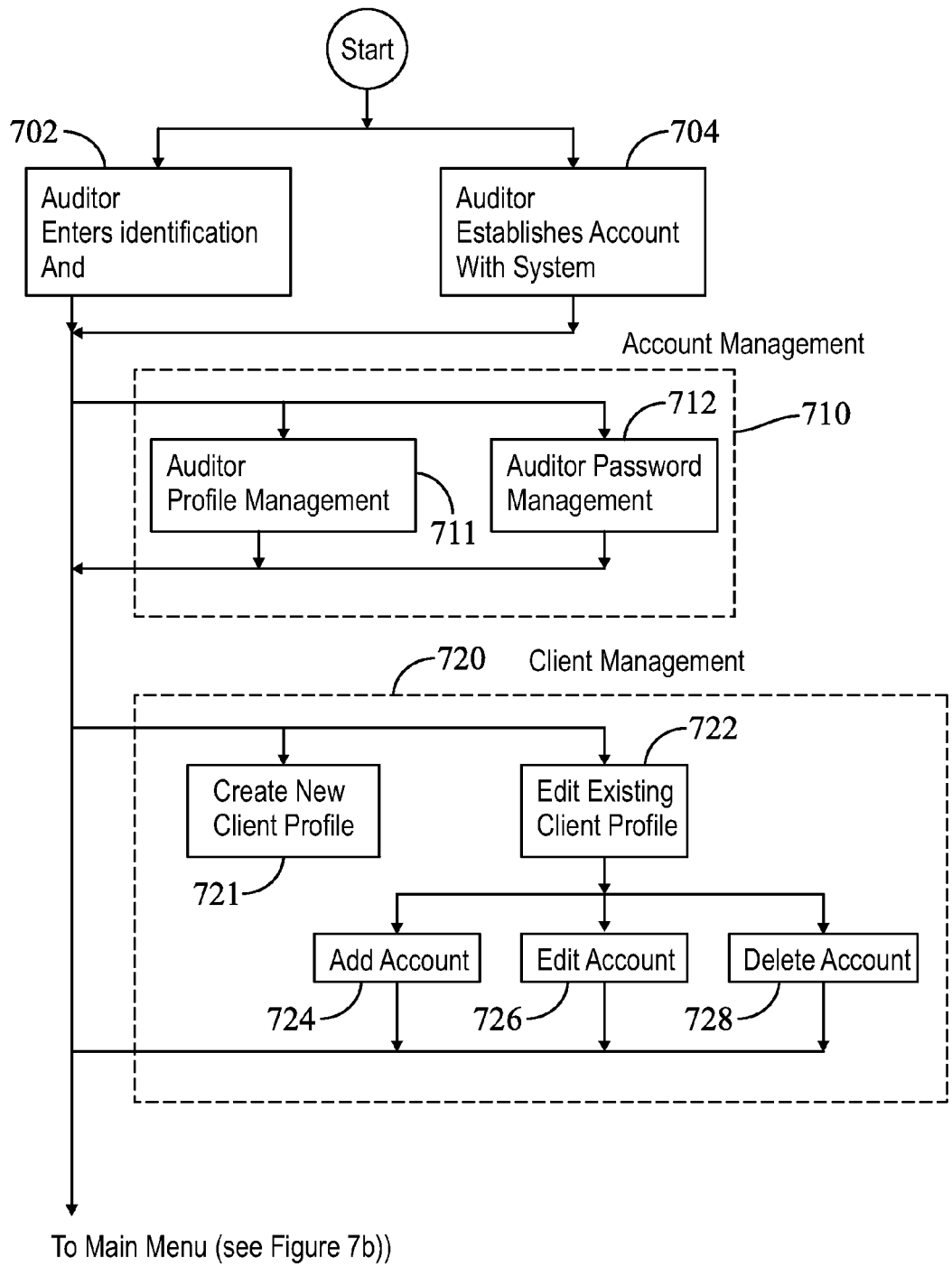
FIGS. 7a-b provide a work flow diagram of an auditor as a user of a computer system for third-party confirmations according to one embodiment of the present invention.
Figure 7B:
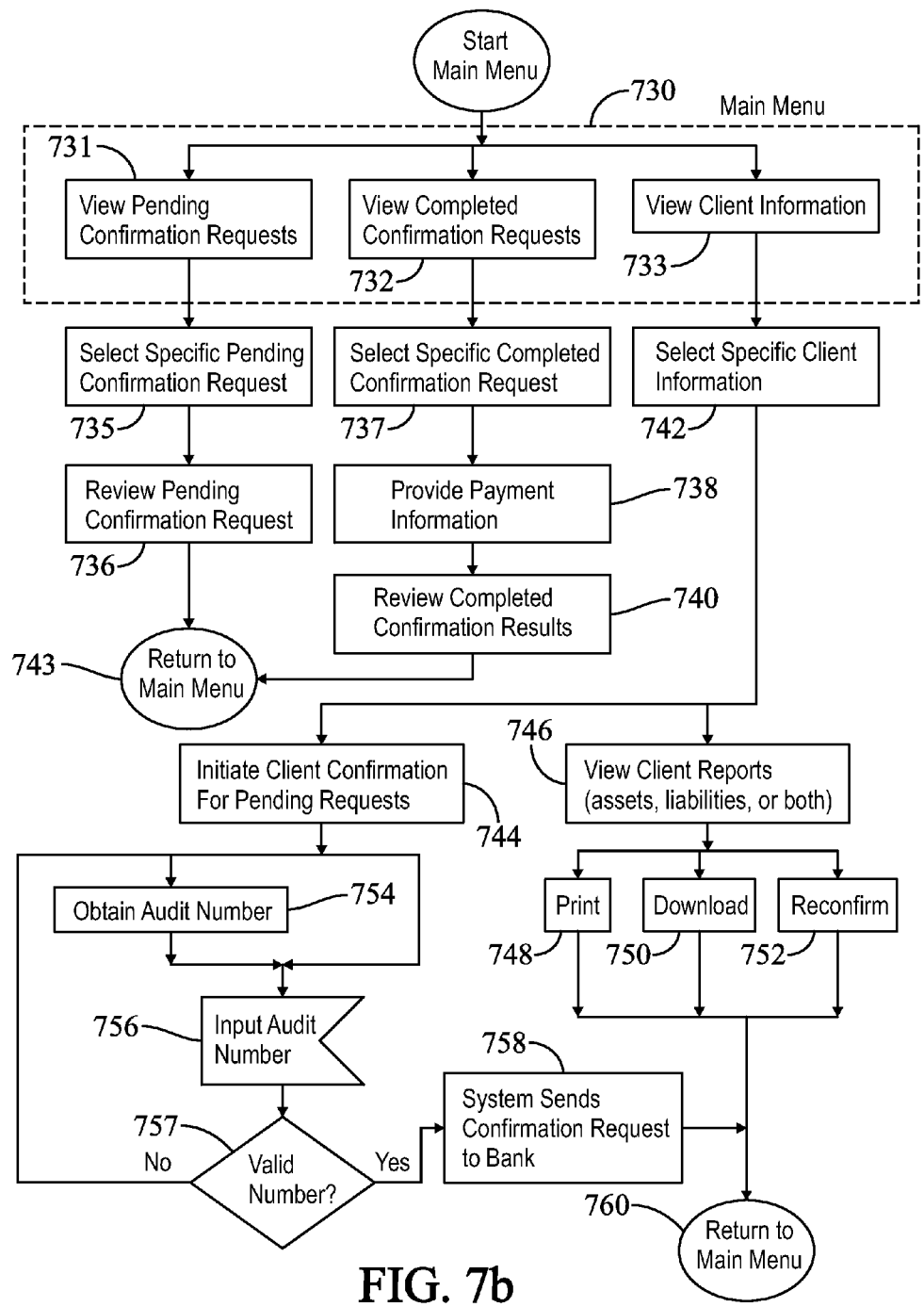

FIGS. 7a and 7b provide the workflow from the perspective of the auditor. Similar to the initial client registration procedure described for the client, the auditor similarly sets up an auditor profile with the confirmation system by providing necessary information (e.g., accountant name, accounting firm, address, phone, fax, etc.) in step 704. Typically, this is done by the auditor using the browser on the auditor's computer to interact with the confirmation server to provide the data according to the prompts provided by the confirmation system. The auditor is then provided with a valid username and password for accessing the confirmation system, typically via a web browser. If the auditor already has obtained the identification and password information, then this step does not have to be repeated and the auditor may select the path incorporating step 702 instead.

Once the auditor has logged on, the auditor may be prompted to invoke "Account Management" 710 or "Client Management" 720 functions. These steps are optional, and may not always be invoked when logging onto the confirmation system. The "Account Management" 711 function allows the auditor to edit profile parameters associated with the auditor, such as name, address, and contact information. In addition, the auditor will be capable of performing Auditor Password Management 712 functions that permits the auditor 20 to change and or alter the password for security purposes. This allows the auditor to alter the password given to the auditor by the confirmation system to a password value preferred by the auditor.

Under the Client Management 720 function, which again is optional, the auditor can create new client profile 721 as well as edit an existing client profile 722. For each existing client profile 722, the auditor 20 is capable of adding 724, editing 726 and deleting an account 728 associated with this client. These functions allow the auditor to update or correct various fields stored in the confirmation database regarding the auditor's client.

"View Pending Confirmation Requests" Menu Function

Continuing with FIG. 7b, the auditor confirmation functions listed in the Main Menu 730 comprise "View Pending Confirmation Requests" 731, "View Completed Confirmation Requests" 732 and "View Client Information" 733.

When the auditor selects "View Pending Confirmation Requests" 731, the auditor can view pending confirmation requests that were previously submitted. The confirmation system accesses its database to select records of pending requests that are associated with the auditor and presents only these records to the auditor. The auditor must select or identify one of the presented pending request in step 735. In response, the confirmation system retrieves the associated confirmation response data associated with the identified confirmation request and provides the associated data in step 736. After viewing the data, the auditor then returns to the main menu in step 743.

Figure 8:
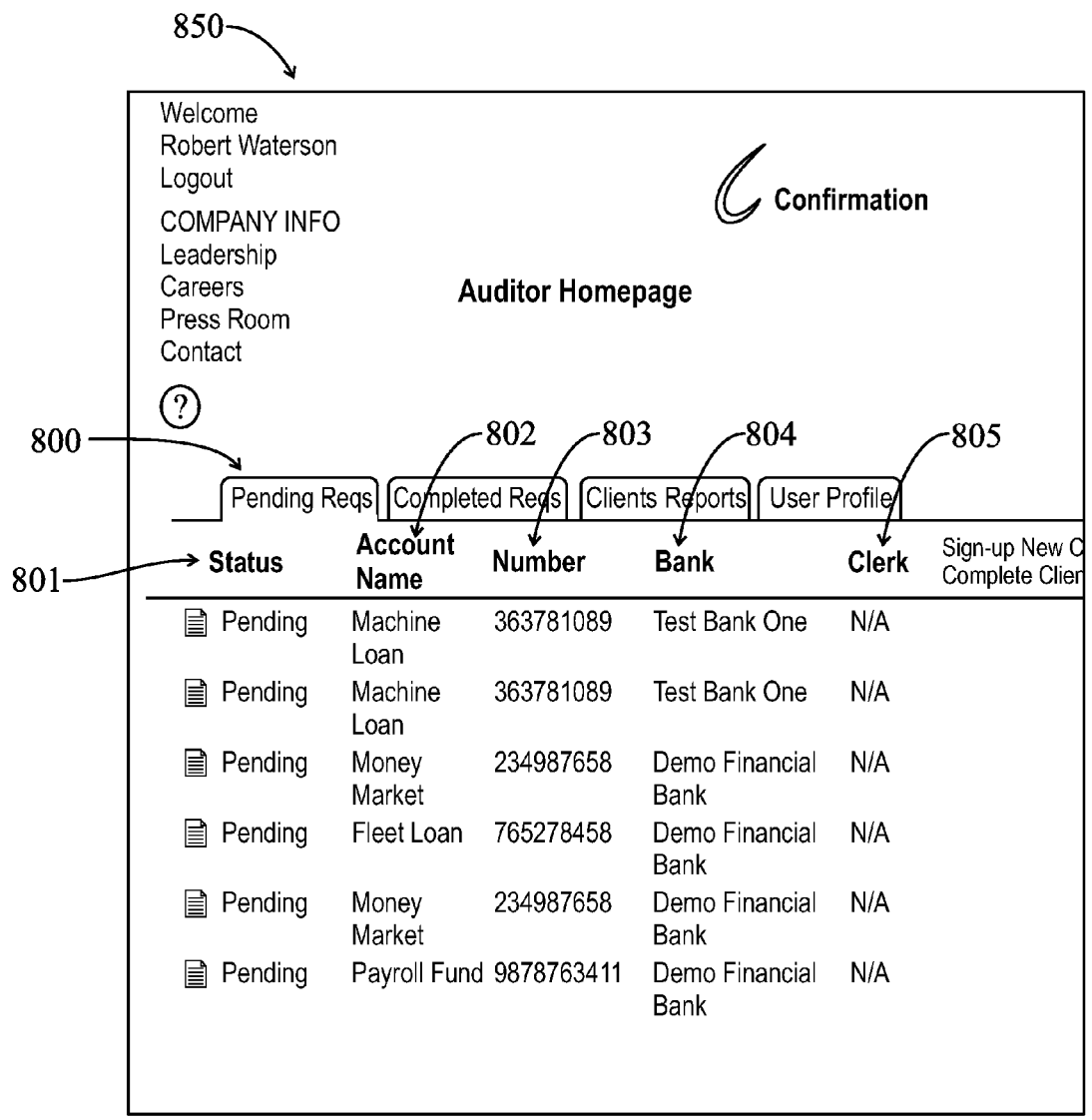
FIG. 8 is an exemplary representation of a pending-requests-listing display screen image of a computer system for third-party confirmations according to one embodiment of the present invention.

The screen display associated with the "View Pending Confirmation Request" response is embodied in FIG. 8. Turning to FIG. 8, the confirmation system provides a screen display image 850 of all pending confirmation requests 800 that have been submitted to the system by the auditor, but have not yet been confirmed by the corresponding bank. Each pending confirmation request 800 contains Status 801 as "pending," Account Name data 802, Account Number data 803, Bank data 804, and Clerk data 805. Because the request has not been confirmed, the Clerk data is indicated as "N/A" for "not applicable."

Figure 9:
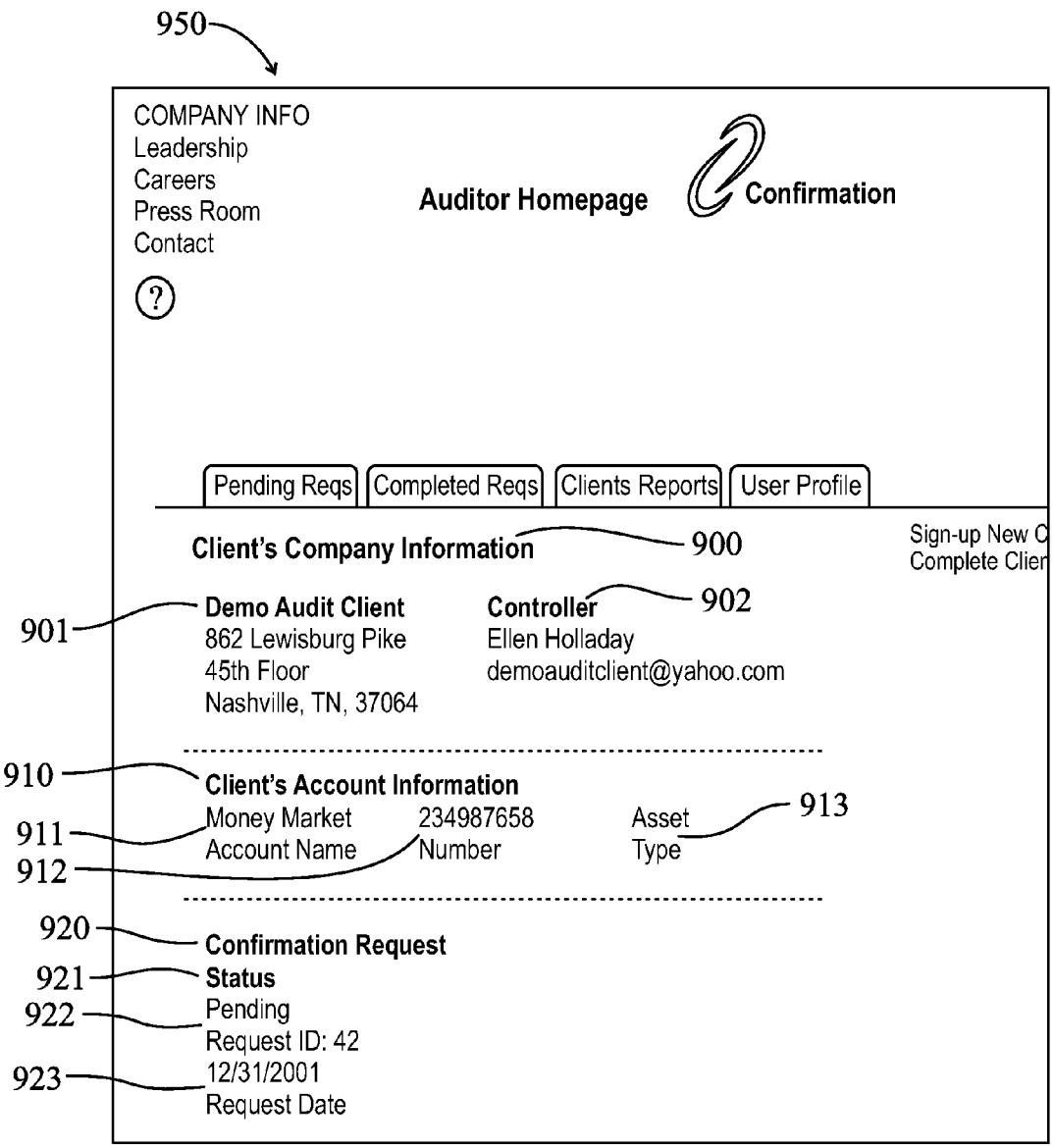
FIG. 9 is an exemplary representation of a specific pending request display screen image of a computer system for third-party confirmations according to one embodiment of the present invention.

If the auditor selects a particular account for viewing, the specific account data is shown in FIG. 9. Turning to FIG. 9, the screen display 950 comprises specific information including Client's Company Information 900, Client's Account Information 910, and Confirmation Request Information 920. More specifically, the Client's Company Information 900 comprises Client Address 901 and Controller contact 902 (i.e., Controller name and email). Other types of information (e.g., multiple controller contacts, telephone numbers, etc. may be indicated). The Client's Account Information 910 comprises Account Name 911, Number 912 and Type 913 (i.e., asset or liability). The Confirmation Request Information 920 comprises Status 921 of the request as pending, Request ID 922 and a Request Date 923. The Request ID 922 is an identification number that is generated and assigned by the confirmation system to a confirmation request received from the auditor.

"View Completed Confirmation Requests" Menu Function

Another main menu function indicated in FIG. 7b that is available to the auditor is the "View Completed Confirmation Requests" function 732. This function allows the auditor to view data pertaining to a completed request. In other words, this function indicates to the confirmation system to select those records from the database associated with the auditor for which confirmation data has been provided. These may be further limited to those requested in the last 30 days, or in some other fashion. In order to view the data, the auditor must select the specific complete request to view in step 737. The auditor may be require to provide payment information in step 738 to the confirmation system operator, such in as the form of a credit card or debit account number or other methods, after which in step 740 the auditor is the provided the completed confirmation results.

Figure 10A:
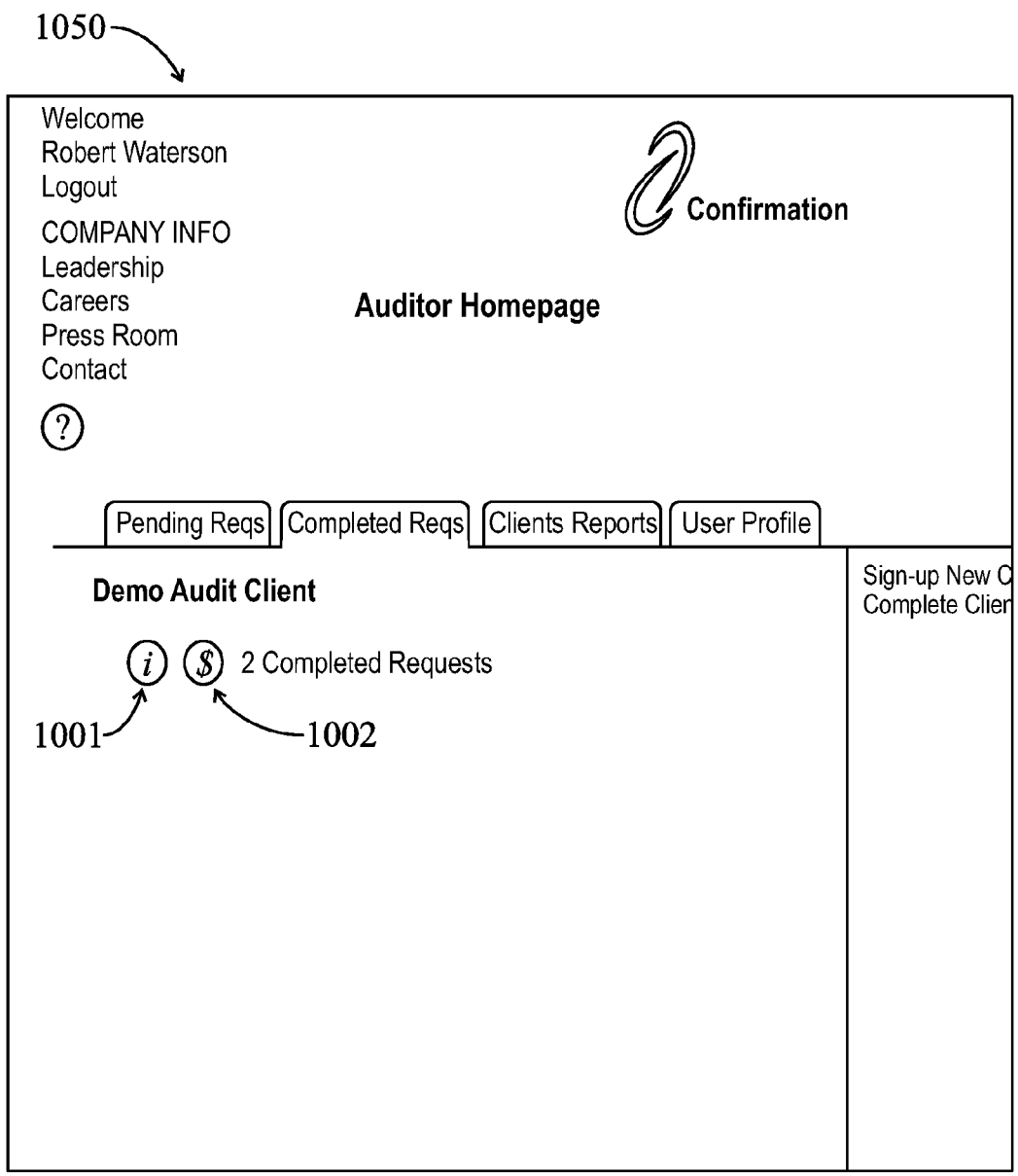
Figure 10B:
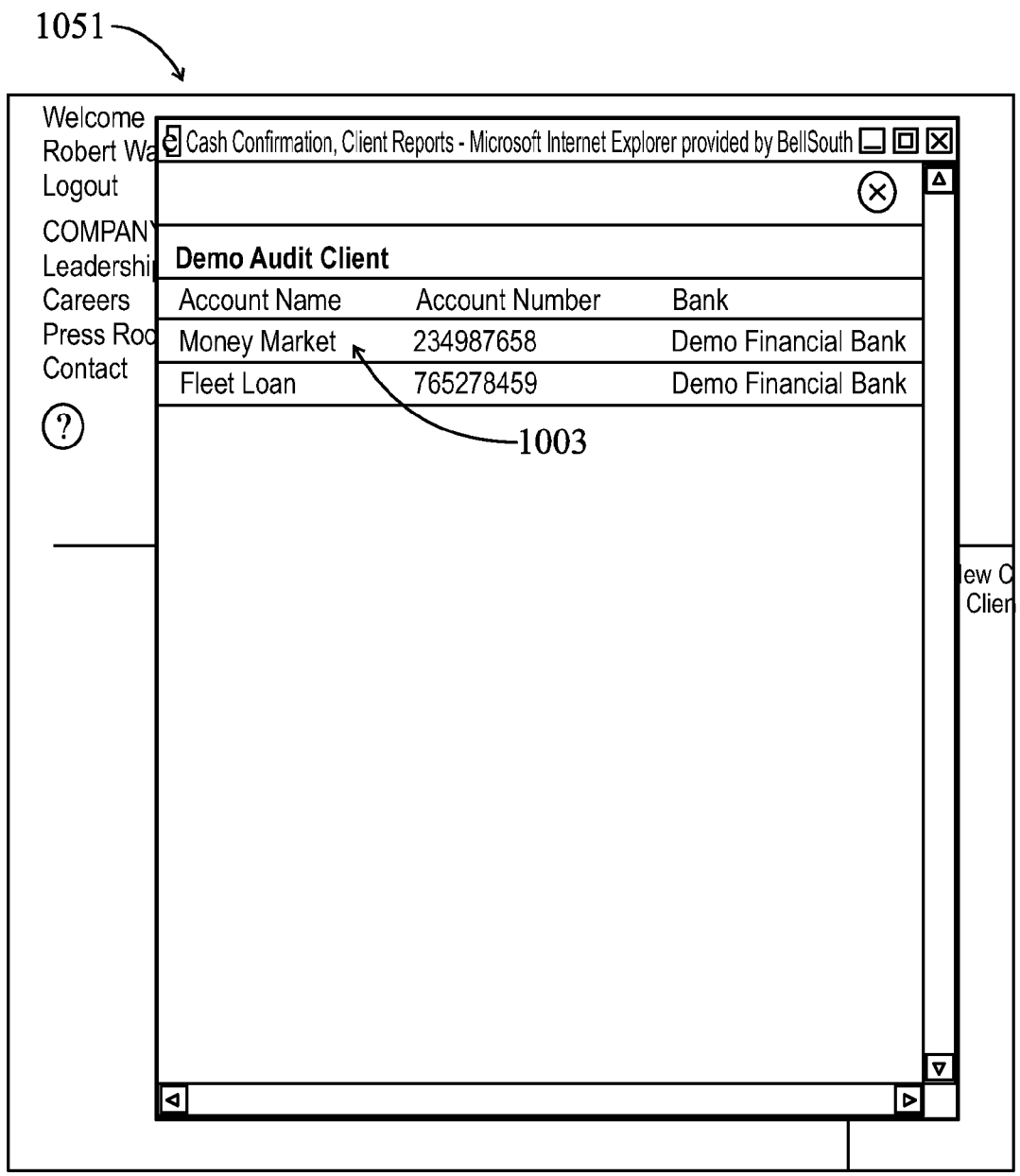
Figure 10C:
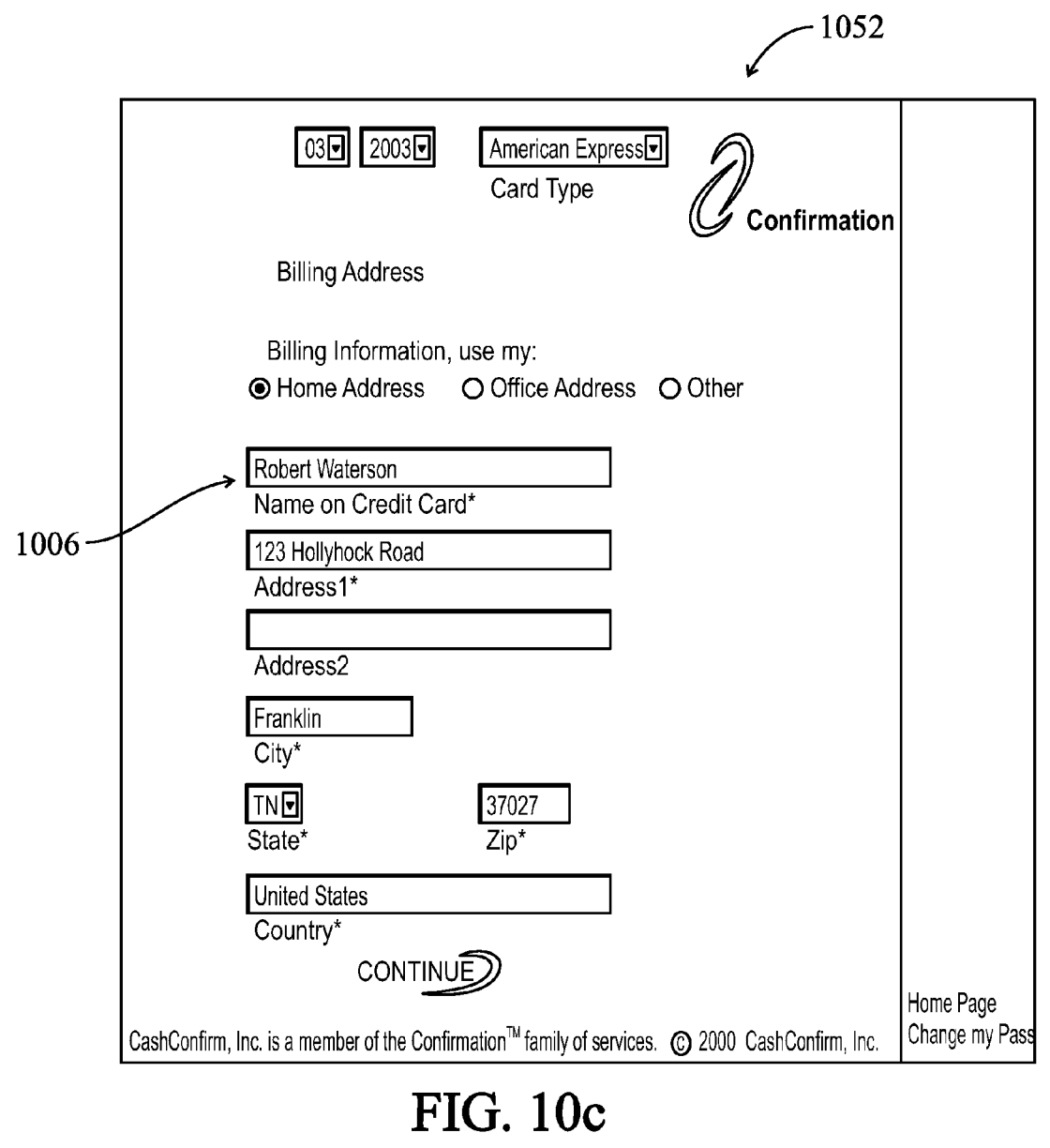

The associated screen displays that may be provided to the auditor are disclosed in FIGS. 10a-10c. Turning to FIG. 10a, one embodiment of the auditor's homepage 1050 is shown. In FIG. 10a, the screen image 1050 indicates that the auditor may select an icon 1001 or 1002 to see a list of completed confirmation requests or provide payment information, respectively. In FIG. 10b, the screen display 1051 shows a list of confirmation requests 1003. In FIG. 10c, one embodiment of a screen display 1052 for the auditor to provide payment information, including the auditor's identification information 1006 and credit card type is disclosed.

Figure 13:
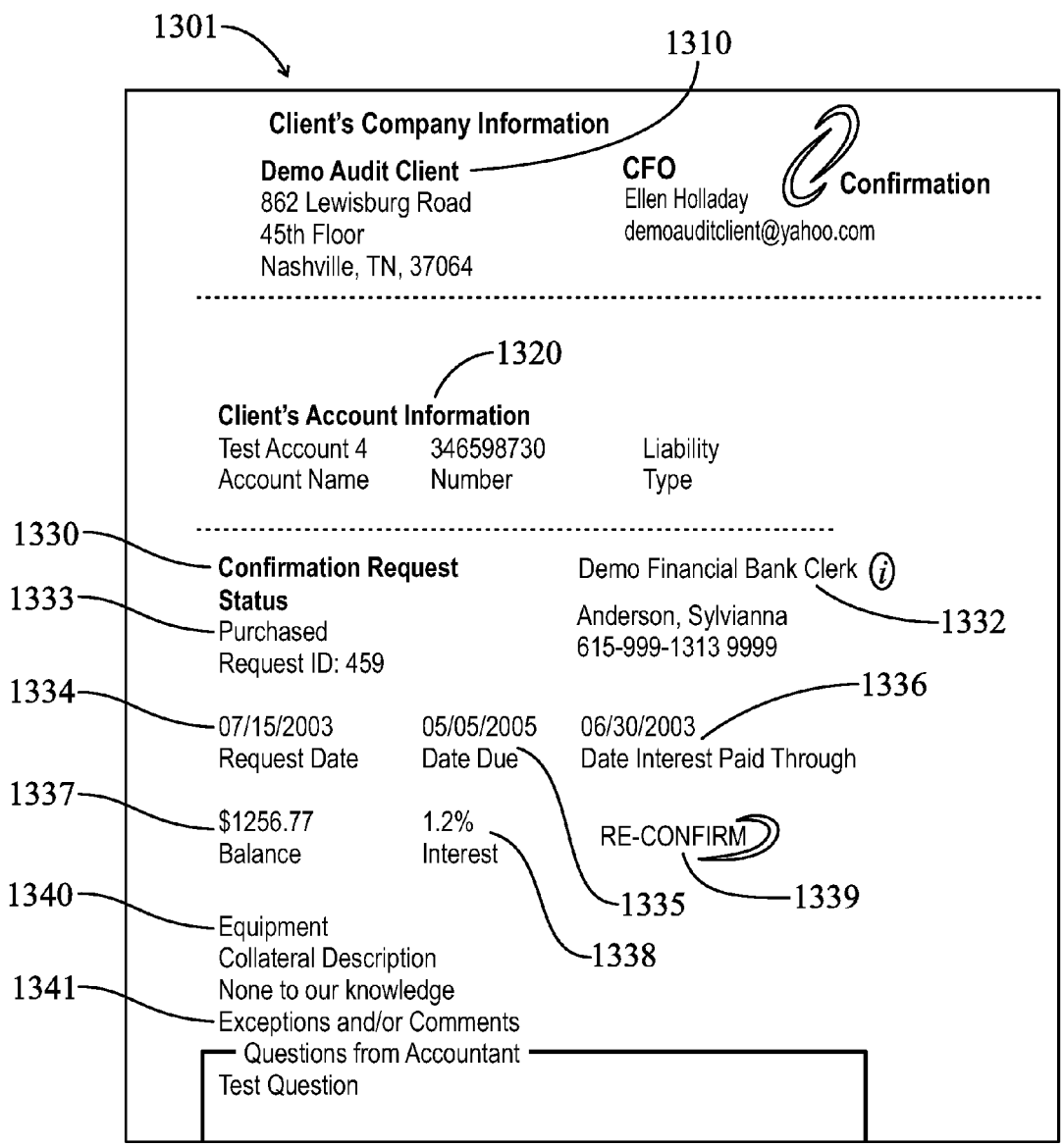
FIG. 13 is an exemplary representation of a screen display image indicating purchased request information for third-party confirmations according to one embodiment of the present invention.

Turning to FIG. 13, one embodiment of viewing a complete confirmation request is disclosed. In FIG. 13, the screen display 1301 comprises information about the audited client 1310, including the client's account information 1320. The confirmation request 1330 is indicated with its status 1333, namely that the appropriate fee has been paid to allow viewing (e.g., it has been 'purchased'). Other associated information, such as the request data 1334, the bank clerk name and contact 1332, the appropriate due data 1335 and the most current data for which interest has been paid through 1336 is indicated as well. Finally, the account balance 1337, the interest rate 1338, nature of the account 1340, and any comments or exceptions 1341 are provided. The screen also provides an icon to resubmit the request for re-confirmation 1339 if there is any need to obtain an updated status of the account.

"View Client Information" Menu Function

Figure 11:
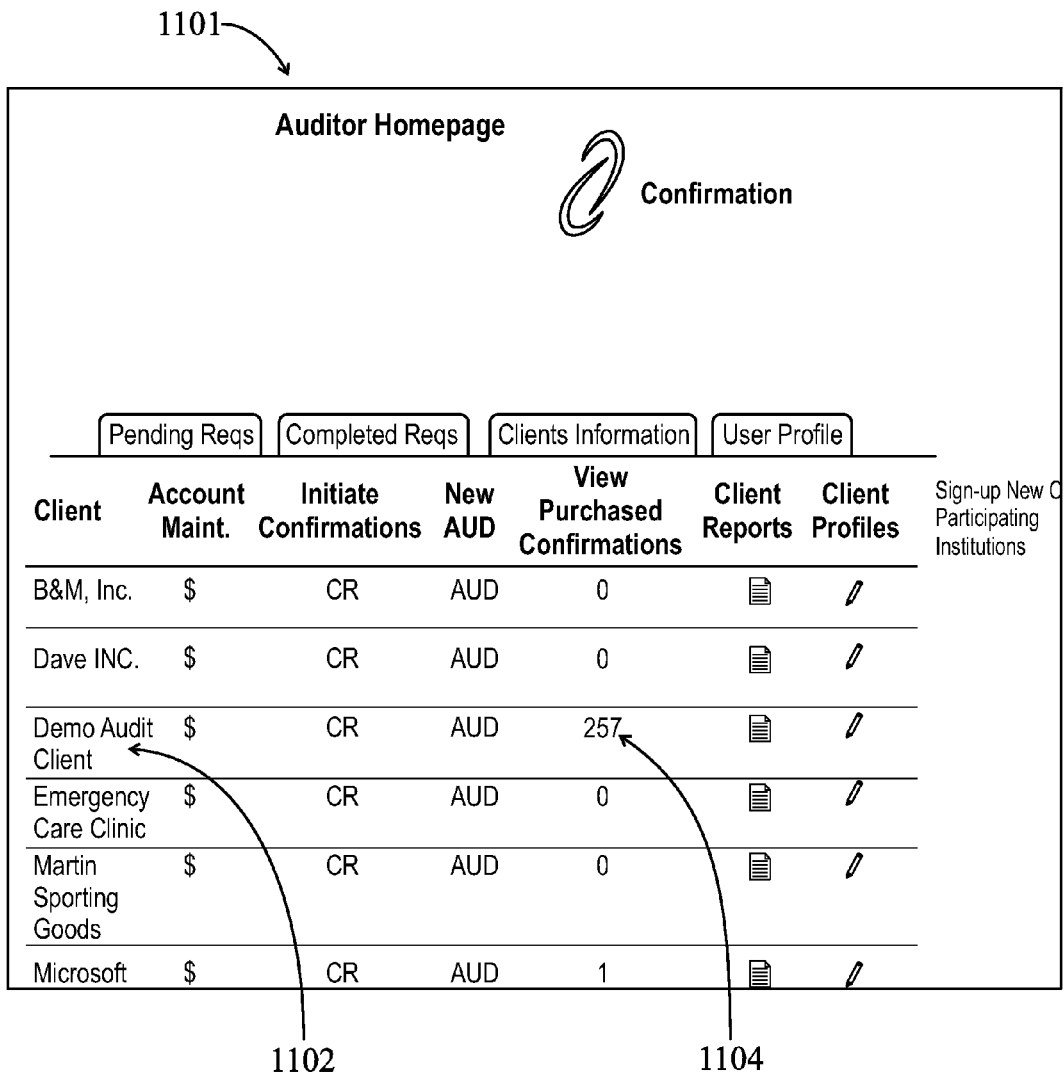
FIG. 11 is an exemplary representation of a screen display image presented to an auditor user for managing client information according to one embodiment of the present invention.

Another menu option presented to the auditor shown in FIG. 7b is the "View Client Information" menu function. Turning back to FIG. 7b, if the auditor selects "client information" 733, a list of the clients that have authorized the auditor to request third-party confirmations will be provided One embodiment of the information displayed is provided in FIG. 11. In FIG. 11, the screen display 1101 provides a list of pending confirmation for various clients. For example, in the embodiment shown in FIG. 11, one client, "Demo Audit Client" 1102 is shown as having 257 confirmations 1104 available for viewing. The auditor may return to the main menu to select and view a particular confirmation request or may select the appropriate icon to receive the indicated information. If the auditor selects to review a client report by selecting icon 1106, then the auditor is presented with a list of all the confirmation requests (both pending and completed) as shown in FIG. 12.

Figure 12:
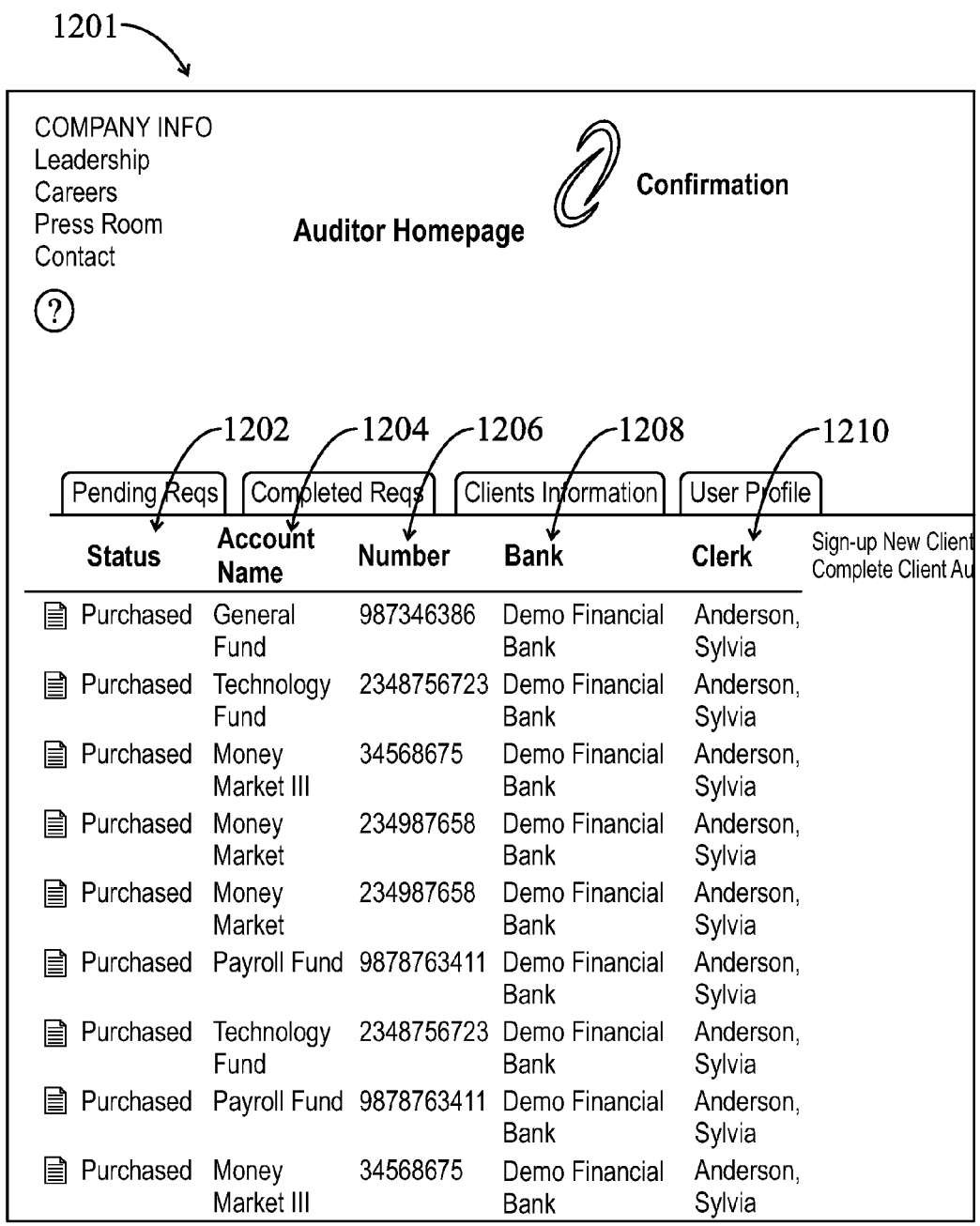
FIG. 12 is an exemplary representation of a screen display image accessible to an auditor indicating purchased confirmation requests associated with one specific client according to one embodiment of the present invention.

Turning to FIG. 12, the screen display image 1201 indicates a plurality of confirmation requests. Each request includes a field indicating the status 1202 as to whether the confirmation has been responded to and purchased, the name of the account 1204, the account identification 1206, the name of the bank 1208, and the clerk identification, typically the name of the bank clerk who provided the confirmation response data 1210.

Returning to FIG. 7b, once the auditor has selected a particular client, then auditor may indicate the function of "Initiate Client Confirmation For Pending Requests" in step 744 or the auditor may view a specific client's reports in step 746.

If the auditor selects initiating a client confirmation in step 744, then the auditor must obtain an audit number in step 754 if one has not already been obtained and provide it to the confirmation system in step 756 as evidence of authorization from the client to access the client's information. If the auditor requires a new number, the confirmation system typically communicates the audit number to the client, who in turn, communicates it to the auditor. Although the audit number is one embodiment of authorization of the auditor, various other means could be used, such as providing personal information of the auditor (e.g., social security number, mother's maiden name, biometric information, etc.). If the audit number is tested as valid in step 757, then the confirmation request is posted to the appropriate bank in step 758.

If the auditor selects "View Client Reports" 746, then the auditor may print 748, download 750, or request a confirmed request be 'reconfirmed' in step 752.

Further, though not shown on the flowchart, the auditor may also add, delete and edit the account information for each client. In other words, the auditor is has similar capabilities as the client itself in maintaining the account information.

One embodiment of a report that can be viewed or requested by the auditor is shown in FIG. 14. Turning to FIG. 14, the screen display 1400 comprises data including the client's name 1401, the name of the account 1404, the account number 1406, the current balance 1408, the current interest rate 1410, the bank serving the account 1412, and the name of the bank clerk that confirmed the account 1414.

In other embodiments, the report information can be presented in various formats, such as a plurality of pages wherein each page resembles the image of FIG. 13.

Third-Party (Financial Institution) Functions and Interactions

The other user that interacts with the confirmation system is the third-party or financial institution, typically a bank. A bank or financial institution can be viewed as on embodiment of a third-party, and the description of the embodiment herein uses "bank" to illustrate the principles of the present invention, but is not limited to banks only. Thus, the principles of the present invention apply to other types of financial institutions as a third party, including mortgage lenders, investment firms, credit unions, etc. Further, nonfinancial institutions, such as other businesses, government organizations, charities, etc. may be specific instances of a third party.

Figure 15A:
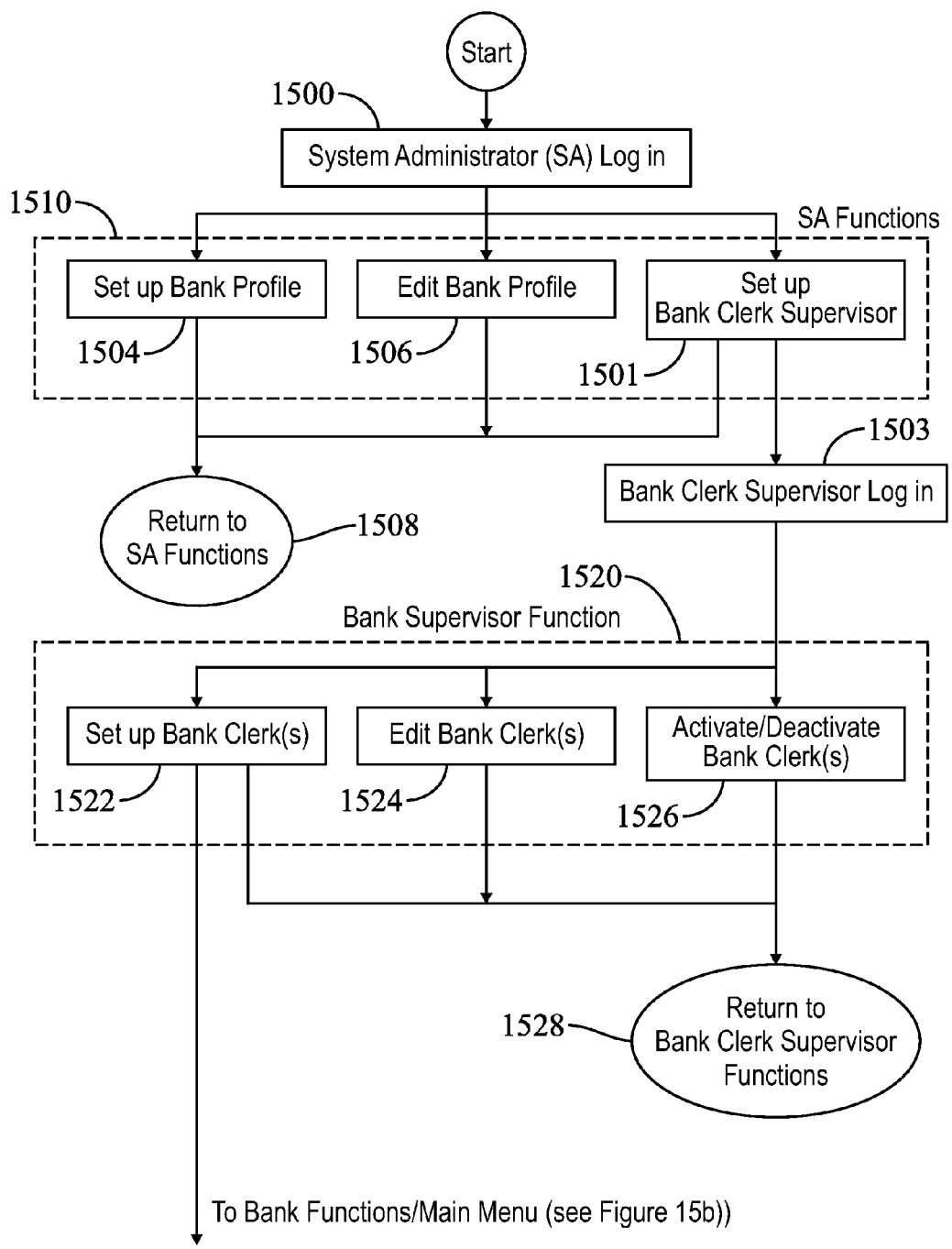
FIGS. 15a and 15b provide a work flow diagram of a bank user of a computer system for third-party confirmations according to one embodiment of the present invention.
Figure 15B:
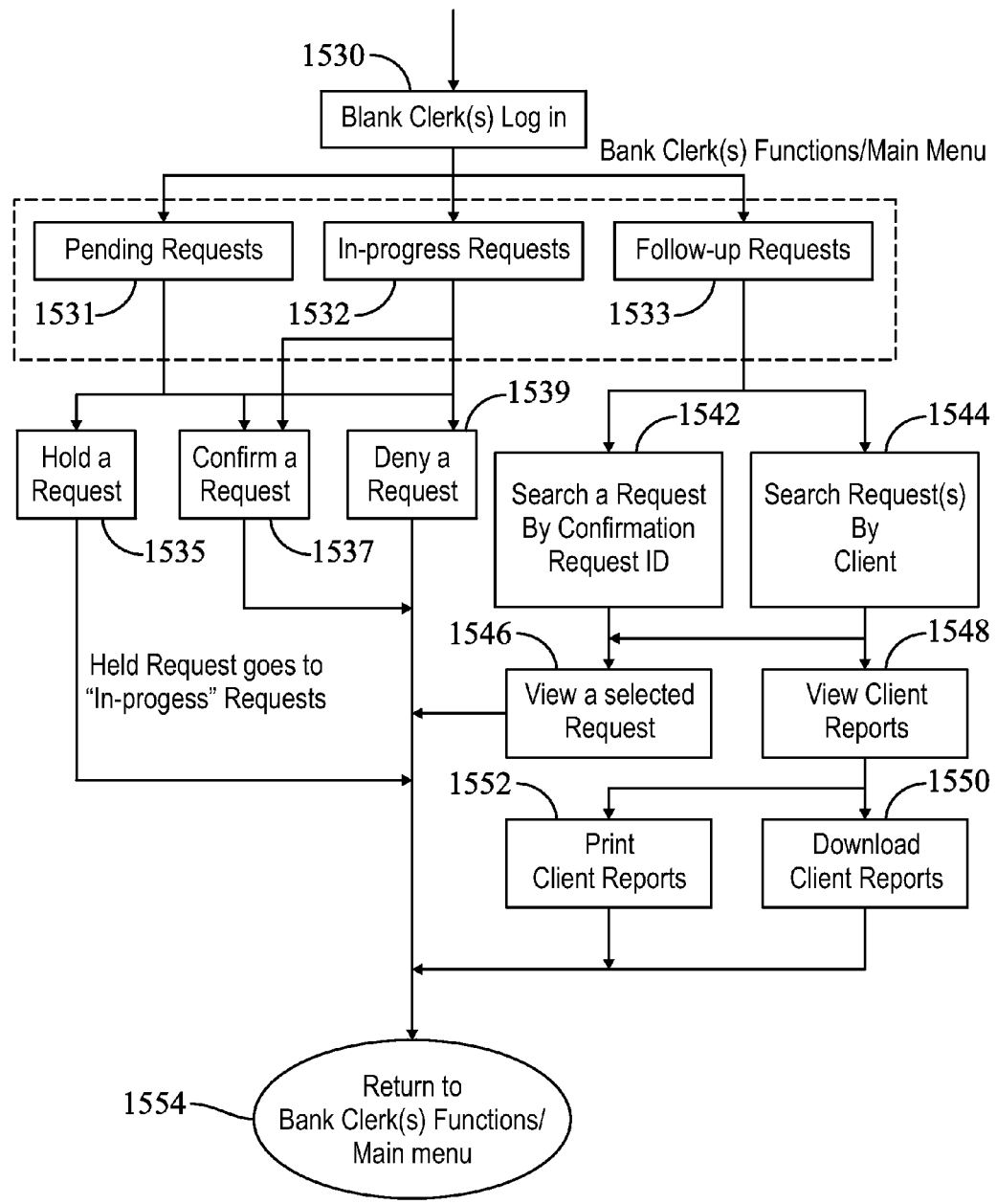

Turning to FIG. 15, the functions performed by the bank user are demonstrated in the flowchart in FIGS. 15a and 15b. Similar to the other users, the bank user must have an account established. Because a bank may have numerous clerks employed for confirmation processing, a system administrator at the bank is typically used for the bank's administration of the bank clerk's accounts. Typically, a system administrator associated with the operation of the confirmation system establishes the individual bank clerk's accounts. First, bank supervisor's account must be established. This is shown in step 1500 by the confirmation system administrator logging into the confirmation system. Next, the system administrator may invoke various system administrator functions 1510 that include establishing the bank's profile in step 1504, editing the bank's profile 1506, or creating a particular bank's supervisor account in step 1510. In establishing the bank profile, the identification and contact information for the bank is established. This data can be later changed by editing the bank's profile.

After this has been established, a bank may access the confirmation system. Typically, the initial functions involve the aforementioned bank supervisor logging onto the confirmation system in step 1503 and invoking one of the bank supervision functions 1520. These functions are used to allow the bank to created, edit, or activate/deactivate a particular bank clerk's account on the confirmation system. The "set up bank clerk" function at step 1522 allows a bank clerk to access and process confirmation requests. Information regarding a particular bank clerk's profile may be edited by the "edit bank clerk" function 1524. Finally, the bank supervision may activate/deactivate a particular bank clerk's access to the system. This allows suspending a bank clerk's access without destroying that particular bank clerk's profile. The process then repeats as required in step 1528.

Once the appropriate accounts have been established, then the normal process of processing confirmations may begin. This is illustrated in FIG. 15b that shows one embodiment. Turning to FIG. 15b, the process begins with a bank clerk logging onto the system at step 1503. At this point, the bank clerk may select three functions: review pending request 1531, view in-progress requests 1532 or view follow-up requests 1533.

Figure 16:
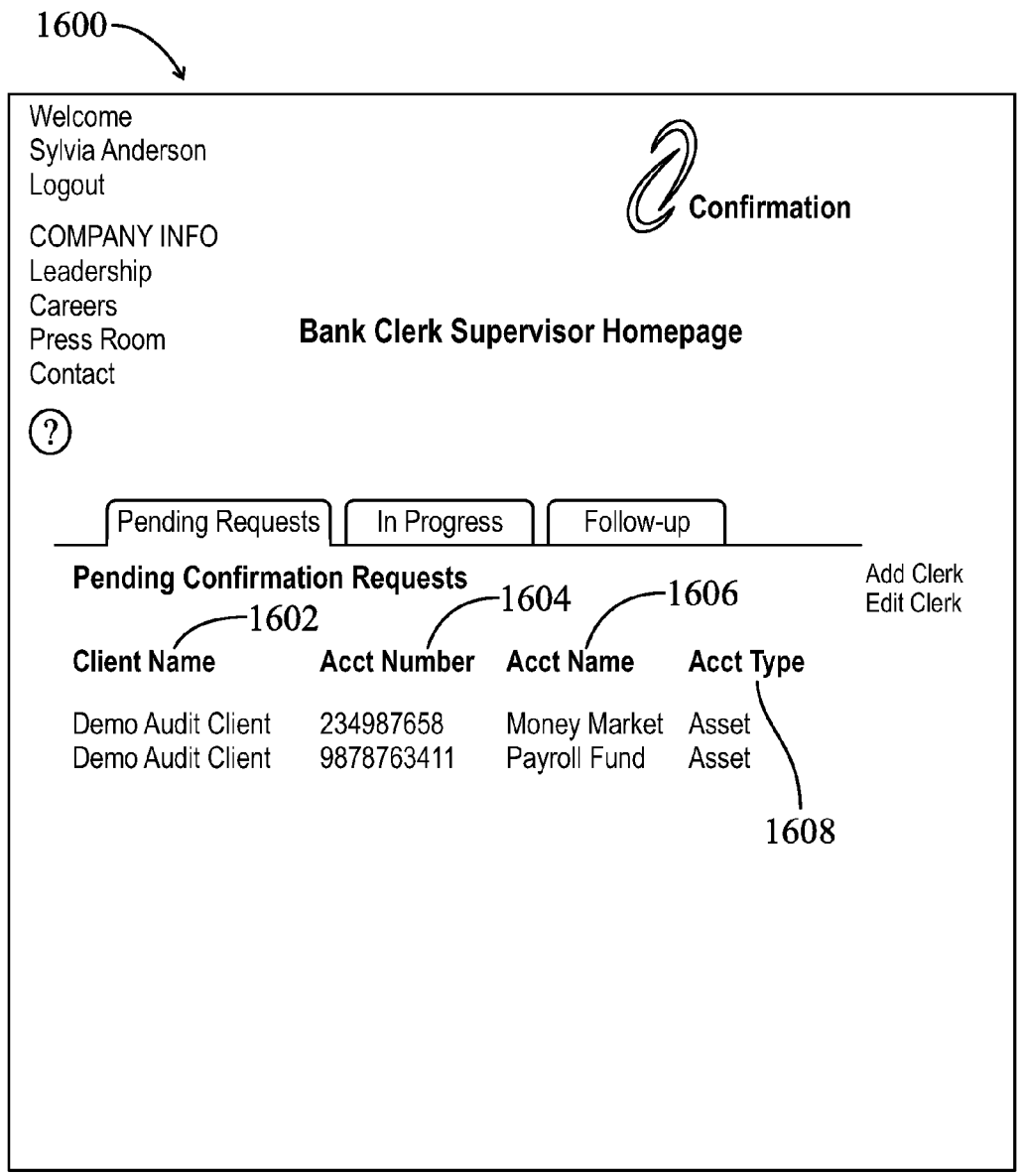
FIG. 16 is an exemplary representation of a display screen image accessible to a bank user for viewing pending confirmation request according to one embodiment of the present invention.

The "pending requests" function 1531 shows all requests that are pending. A sample screen display is depicted in FIG. 16. In FIG. 16, the screen display 1600 comprises records of pending (e.g., unresponded to confirmations) that include the client's name 1602, the client's account number 1604, the nature of the account 1606, and the account type 1608.

As shown in FIG. 15b, by selecting an account using a point or other means, the bank clerk may "hold" or suspend the request 1535 (for later completion), confirm the request 1527, or deny the request 1539. Typically, the bank clerk confirms the request by providing data regarding the requested account. If the clerk is unable to provide the data for the account (e.g., it does not exist or has been closed), the clerk will deny the request.

Figure 17:
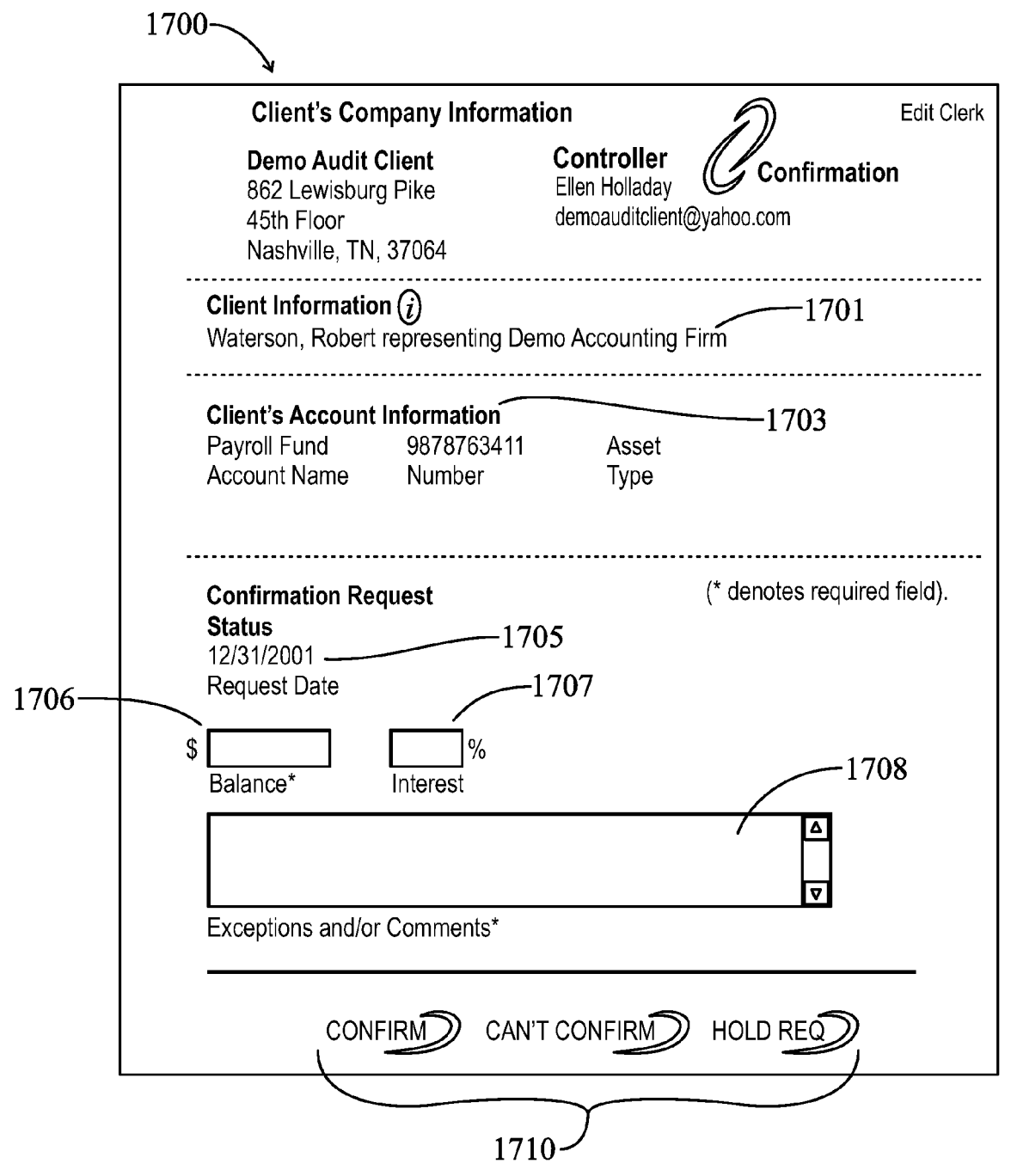

Upon selecting the confirmation of a specific request, the bank clerk may be presented a screen display as shown in FIG. 17. Turning to FIG. 17, the bank clerk is presented with basic information such as the auditor making the request 1701, the client account information 1703, and the date of the request 1705. The bank clerk provides data indicating the balance 1706, the bearing interest rate 1707, and the selects the "confirm" function 1710. If the bank clerk selects "can't confirm", the bank clerk is required to provide a reason in the comment field 1708 for denying the request. The reasons for denial include, but not limited to, invalid account name, invalid contact name and incorrect client name. If the required account data is temporarily unavailable, the bank clerk alternatively may select to "hold" the request so that the pending confirmation request becomes an in-progress request.

Returning to FIG. 15b, the bank clerk may select the "search for in-progress request" function 1542 later for confirming or denying a request put on hold. In this case, the bank clerk can search a confirmation request based on a Request ID and then view the specific request information in the same format as the auditor and client.

The bank clerk can also search all confirmation requests associated with one specific client 1544 and obtain a list of searched results. A client report 1548 as described above that contains the list of confirmation requests associated with a specific client can be generated by the confirmation system for printing 1552 or may be downloaded 1550 to the bank clerk.

A benefit of this approach includes financial institutions eliminating the paper confirmation process, which includes mailroom sorting and distributing the incoming confirmations, having the financial institution's clerks then look up the needed information on the financial institution's computers then fill out by hand the paper confirmation, and finally sending the confirmation back through the financial institution's mailroom for redelivery. Also eliminated or reduced is the need for second confirmations to be processed by the financial institution, which can occur if confirmation is lost in redelivery to the auditor or is filled out incorrectly, doubling the amount of time spent by the financial institution on a confirmation, Also, if the paper confirmation process malfunctions a third time, additional resources are used because the protocol is for the auditor to: talk with the financial institution's clerk on the phone, fax over a paper confirmation from which the financial institution's clerk again looks up the information on the computer, fill out the paper form by hand, and then fax it back to the auditor. To utilize the present invention, financial institutions may be required to sign a minimum duration service contract (e.g., a period such as three years) to be their sole provider for online confirmations. In return, the financial institutions will save money through the elimination of a cost center. Likewise, accountants using the systems, methods and computer program products of the present invention may be charged a nominal fee per confirmation; however, this amount may be billed to the client as a direct third-party expense. With the current confirmation process, accountants absorb the direct costs of the confirmation internally: the costs of postage, envelopes, and the forms. Overall, financial institutions can benefit through becoming more efficient, accountants can benefit by becoming more efficient, and the clients can benefit if the accountants pass through a portion of the savings. Further, all parties may benefit by reducing the opportunity for fraud. Any company, trust/estate, business may likewise use the present invention, or individual that has the need for third-party verifications.

It should be appreciated that the sample discussed above is intended solely as an illustrative example of one system and method of the present invention. Systems, methods and computer program products may therefore be implemented in different manners, as someone skilled in the art would know. Further, as used in herein, 'financial institution' may apply to any business providing data for confirmations and third-party verifications, such as insurance records from insurance companies, health records from health organizations, et cetera.

Figure 18:
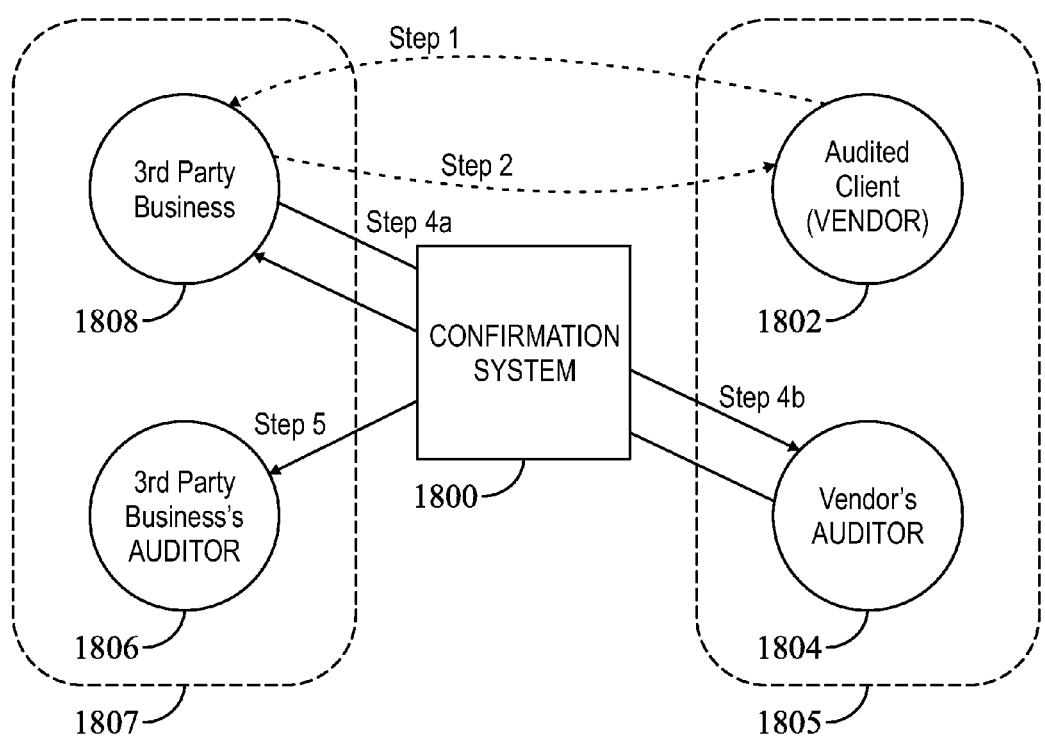
FIG. 18 is a block and process flow diagram of a computer system for third-party confirmations according to one embodiment of the present invention.

Further, application of the principles of the present invention is not limited to the aforementioned embodiment of an auditor, client, and financial institution. Other embodiments are possible, such as that illustrated in FIG. 18. FIG. 18 illustrates a scenario of various steps associated with use of the confirmation system to confirm the type and amount of a particular accounts receivable. In this example, a pre-existing business relationship exists between a Vendor 18082 and a Third Party Business 1808 that has purchased certain products from the Vendor. Thus, in Step 1, the products have been provided to the Third Party Business and in return, in Step 2 the Third Party Business promises to pay the Vendor. The Vendor would enter the sum in their accounts receivable, and the Third Party Business would enter the same sum in their account payable.

Assuming at this point that the Vendor 1802 is audited by the Vendor's Auditor 1804. The auditor-client relationship is indicated by the dotted line 1805. In some embodiments, the Auditor may be an internal organization of the Vendor, or it may be an independent third party accountant. Further assume that the Third Party Business 1808 has an Auditor 1806 as well. This again, could be an organization internal to the Third Party Business or an independent third party accountant. This separate auditor-client relationship is indicated by a different dotted line 1807.

The Vendor's Auditor may desire to confirm the existence and amount of the account received. Assuming that the relevant parties have established accounts with the Confirmation System 1800, the Vendor's Auditor initiates in Step 3a a confirmation request to the Confirmation System 1800. The information includes an indication of the target Third Party Business from which the confirmation is requested, and the type of information for which confirmation is being requested. At some point time later, the Third Party Business receives the confirmation request in Step 3b from the Confirmation System 1800. In Step 4a, the Third Party Business indicates the amount it owes to the Vendor, and the Confirmation System provides this information to the Vendor's Auditor in Step 4*b*.

In addition to these steps, the Confirmation System 1800 can make this information (either the request and confirmation, or just the confirmation data) available to the Third Party Business' Auditor in Step 5. This allows the Third Party Business' Auditor to view the confirmation response provided by the Third Party Business and compare that data with previous data provided to the Third Party Business's Auditor 1806. This ensures the data being reported by the Third Party Business is consistent with data being provided to the Auditor 1806. This further reduces the ability for fraud. Although not specifically disclosed, the aforementioned techniques of security, notification, identification, payment, etc. can apply to governing the access to the Confirmation System by the various users.

Thus, it becomes readily apparent that various types of users can access the confirmation system and for indicating various types of confirmation requests and responses. In the aforementioned embodiments, the "auditor" is typically a party separate from the audited client, but this is not a requirement to practice the principles of the invention. In some embodiments, the auditor may be a person in a group of a corporation delegated with the responsibilities of auditing other groups within the corporation (e.g., an 'internal' auditor). Similarly, the "third party" (e.g., financial institution user or bank clerk) is also illustrated as a separate party, but this is not a requirement to practice the principles of the present invention. In other embodiments, the 'third party' may be affiliated with the audited client, such as the third-party being a person within a group of a corporation delegated with the responsibility of confirming requests initiated by other groups within the corporation.

In another variation of the system operation, the third party for which a confirmation request is desired does not have an account or user profile established on the confirmation system. For the sake of illustration, assume for example, that a particular bank does not have a user profile. Without a user profile established, a bank clerk affiliated with the bank cannot log into the system and receive information regarding pending confirmation requests. In this case, the confirmation system may maintain a mailing address associated with the bank (perhaps indicating a certain department, or contact person), and upon receipt of a confirmation request from the auditor indicating that specific bank, the confirmation system generates a paper copy of the request. The confirmation system automatically prints the confirmation request using the stored address, and results in the confirmation request being delivered using the indicated delivery mechanism (typically, the postal service). The confirmation request may include the auditor's address as defined in the auditor's profile as the return address. In this manner, or variations thereof, users that do not have a profile established on the confirmation system are able to interact with other parties that do.

In another variation of the above scenario, the confirmation system may instead generate an email message to a defined contact at the bank. The email message may be to a generic department, or a specific person, and the contents of the message may contain the confirmation request, or a document (e.g., PDF® or Word®) enclosed as an attachment conveying the confirmation request. Similarly, the confirmation response could be conveyed using an email message to the confirmation system. Such a response could include the appropriate information allowing the confirmation system to validate the sender of the information.

The communication between the systems of the present invention and financial institutions can occur via the Internet, as discussed above, or via one or more additional networks using a variety of communication protocols and services, such as virtual private networks, wide area networks, or enterprise networks. The vast majority of financial institutions around the world are interconnected to one sort of network or another. One common network the financial institutions are tied to is the electronic funds transfer network over which the automated teller machines communicate and through which financial institutions accomplish money wire transfers.

It will be appreciated that the systems, methods and computer program products of the present invention can benefit other business industries besides just accounting. There exists opportunity to help facilitate credit checks, loan applications, governmental audits, and verifications of deposit as well as other opportunities. Specifically, the principles of the present invention can be used to sample receivables and payables in the auditing or other similar processes. Similar benefits and methods apply to sampling these transactions.

As with the current practice of bank confirmations, the client has control over where the receivables and payables confirmations are mailed. Using the principles of the present invention, the auditor's susceptibility to fraud is greatly reduced. The provider of the systems of the present invention, in the role of a third-party intermediary, has no relationship with the company being audited and therefore adds an additional layer of security to the confirmation process.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed' and that modifications and other embodiments are intended to be included within the scope of the appended claims. Although specific terms are employed herein, they are used in a generic and descriptive sense only and not for purposes of limitation.

Further embodiments of the invention are shown in FIGS. 19-28, including methods in which electronic and/or paper signatures are obtained from the client, client personal identification numbers (PINs) are used for authentication, and/or in which there are multiple responders from a single business entity (e.g., employees or divisions of a financial institution, law practice, and/or business doing business with or having one or more accounts with the client). Steps performed by the confirmation system are generally performed automatically. That is, the confirmation system responds to receiving the completion of a step prior to a step conducted by the confirmation system by conducting the next step in the process without further intervention or prompting, such as by a user of the confirmation system.

Figure 19:
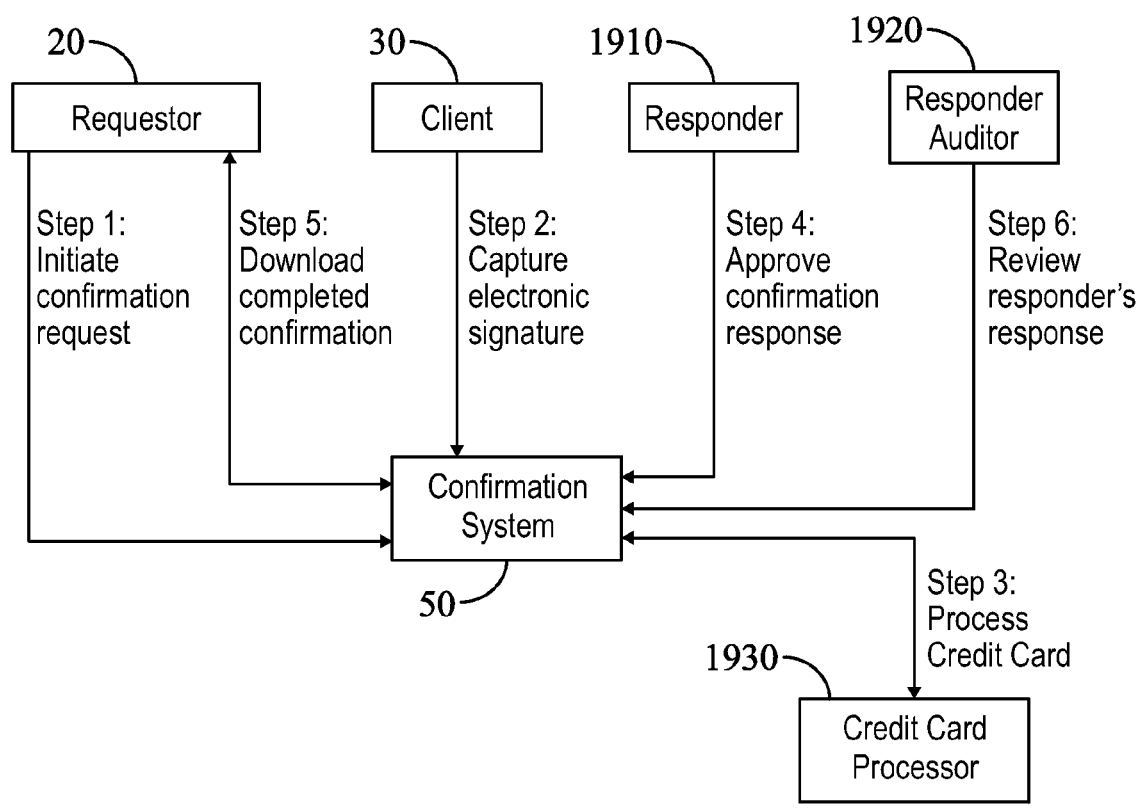
FIG. 19 is a block diagram of one embodiment of a confirmation system and method in which a physical signature is obtained from the audited client.

FIG. 19 is a block diagram of an embodiment of a confirmation system and method in which a physical signature is obtained from the audited client 30. In this embodiment, using a public or private digital communications network connection (e.g., an Internet connection) to the confirmation system 50, the requestor 20 remotely logs in to the confirmation system 50 at step 1, inputs client account data into the confirmation system 50, and initiates a request for confirmation. In step 2, the client 30 logs in to the confirmation system 50 and approves the confirmation request by signing using electronic signature capture. In an optional step 3, the confirmation system 50 processes a credit card for payment by interacting with credit card processor 1930 via a public or private digital communications network connection (e.g., an Internet connection). The credit card information may be provided by the requestor 20 or by the client 30. In step 4, the responder 1910 logs in to the confirmation system 50 by entering a username and password associated with the responder 1910, inputs client response data, and approves the confirmation response. In step 5, the requestor 20 logs in to the confirmation system 50 and downloads the completed confirmation. The confirmation system 50 may indicate to the requestor 20 that the completed confirmation is available via electronic mail. The requestor 20 can also download related reports. Alternatively, the confirmation system 50 may send the requestor 20 the completed confirmation and related reports by, for example, electronic mail in response to the responder 1910 completing the confirmation. In an optional step 6, a responder auditor 1920 logs in to the confirmation system 50 to view the responder's response. The responder auditor 1920 is an auditor of the responder 1910, and viewing the responder's responses enables the responder auditor 1920 to detect fraud in an audit of the responder 1910.

Figure 20:
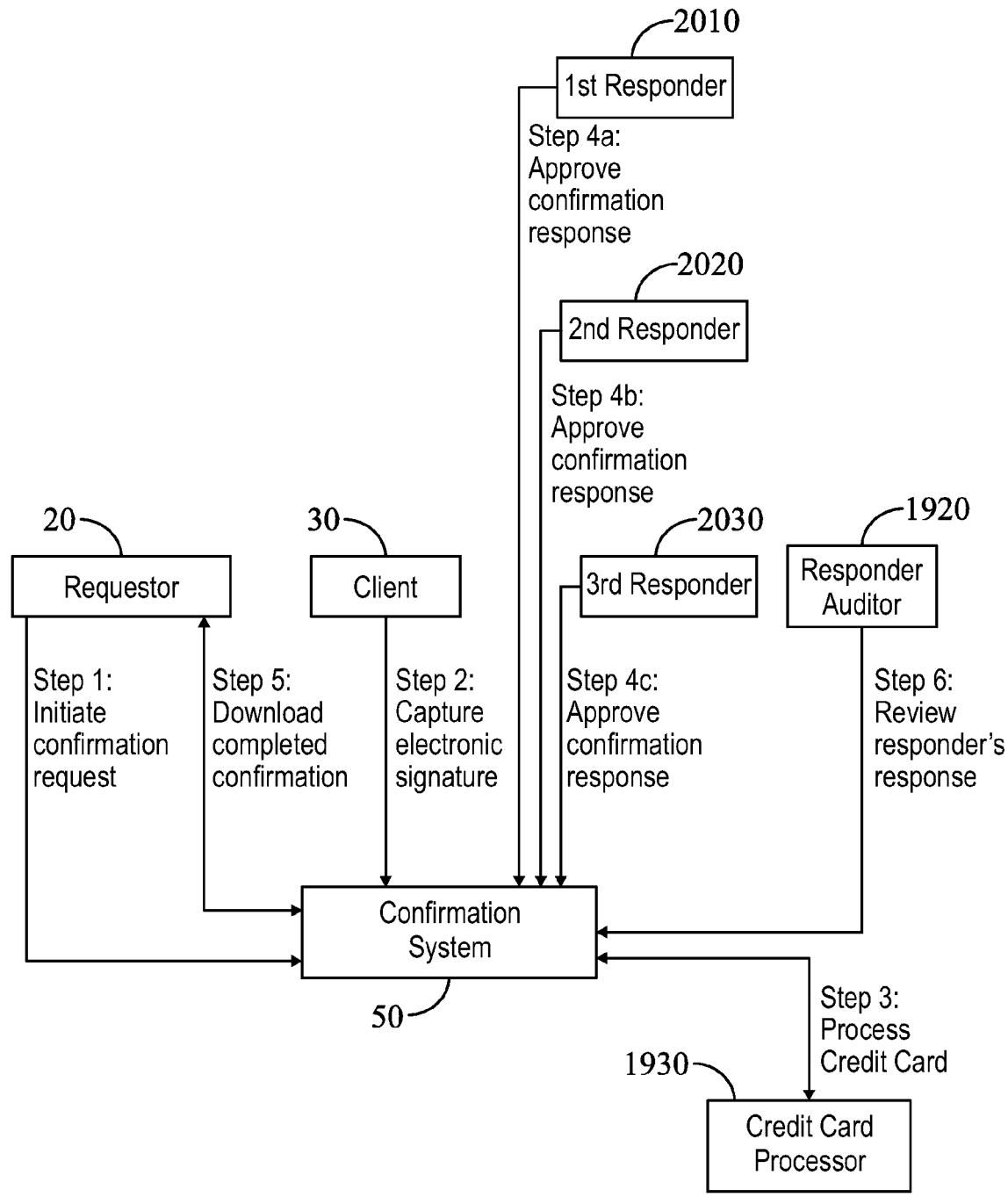
FIG. 20 is a block diagram of another embodiment of a confirmation system and method in which a physical signature is obtained from the audited client and there are multiple responders from the same business.

FIG. 20 illustrates a variation of the confirmation system and method shown in FIG. 19 in which responses are obtained from multiple responders (i.e., first responder 2010, second responder 2020, and third responder 2030) within the same business or company.

Figure 21:
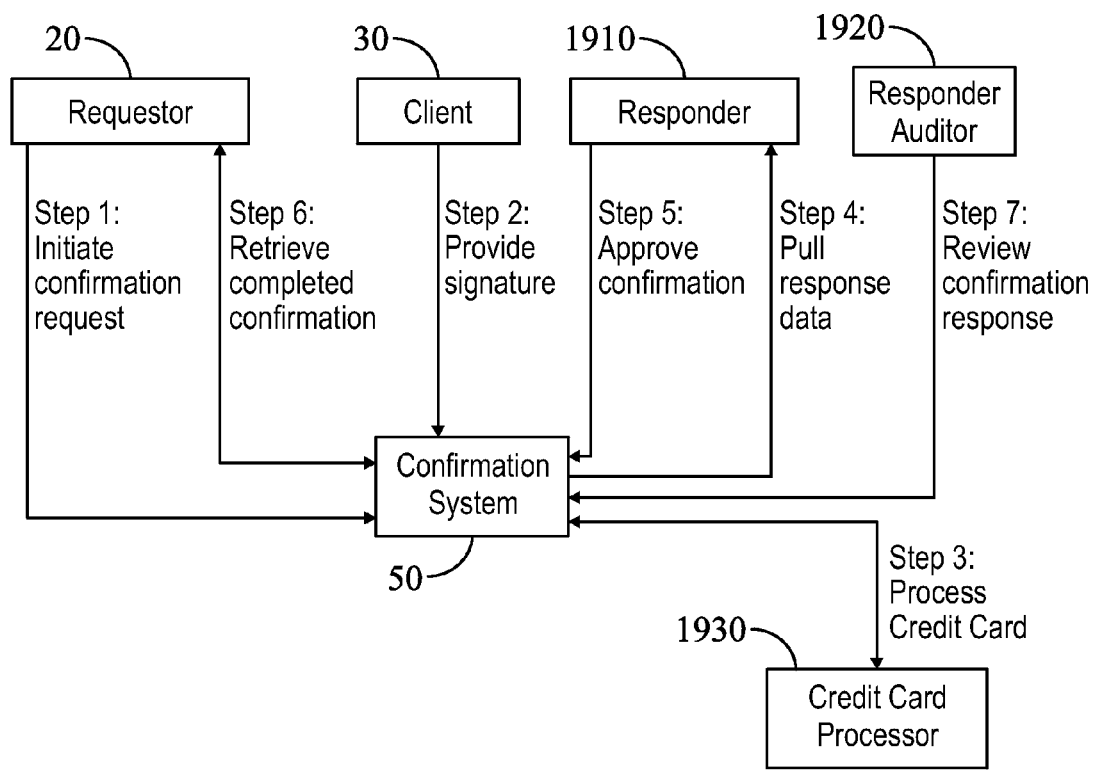
FIG. 21 is a block diagram of another embodiment of a confirmation system and method in which data is pulled from a responder after obtaining a client physical signature.

FIG. 21 is a block diagram of another embodiment of a confirmation system and method in which data is pulled from a responder after obtaining a client physical signature. In a first step 1, the requestor 20 (e.g., auditor) remotely logs in to the confirmation system 50 using a username and password associated with the requestor 20 via a public or private digital communications network connection (e.g., an Internet connection), inputs client account data, and makes a request for confirmation. In a second step 2, the client 30 logs in to the confirmation system 50 with a username and password associated with the client 30 and approves the confirmation request by signing using an electronic signature capture. In an optional step 3, the confirmation system 50 processes a credit card for payment by interacting with credit card processor 1930 via the public or private digital communications network connection (e.g., an Internet connection).

In step 4, the confirmation system 50 accesses the responder 1910, provides credentials associated with the client 30 (e.g., username and password, a PIN, and/or the captured client signature), and downloads confirmation response data. In step 5, the responder 1910 logs in to the confirmation system 50, enters response data, and approves the confirmation response. In one embodiment, the response data edits the client account data in the confirmation system 50 and approves a confirmation response having edited client account data. The requestor 20 then logs in to the confirmation system 50 and downloads the completed confirmation in step 6. The confirmation system 50 may indicate to the requestor 20 that the completed confirmation is available via electronic mail. The requestor 20 can also download related reports. Alternatively, the confirmation system 50 may send the requestor 20 the completed confirmation and related reports by, for example, electronic mail in response to the responder 1910 completing the confirmation. In a final optional step 7, the responder auditor 1920 logs in to the confirmation system 50 to view the responder's response.

Figure 22:
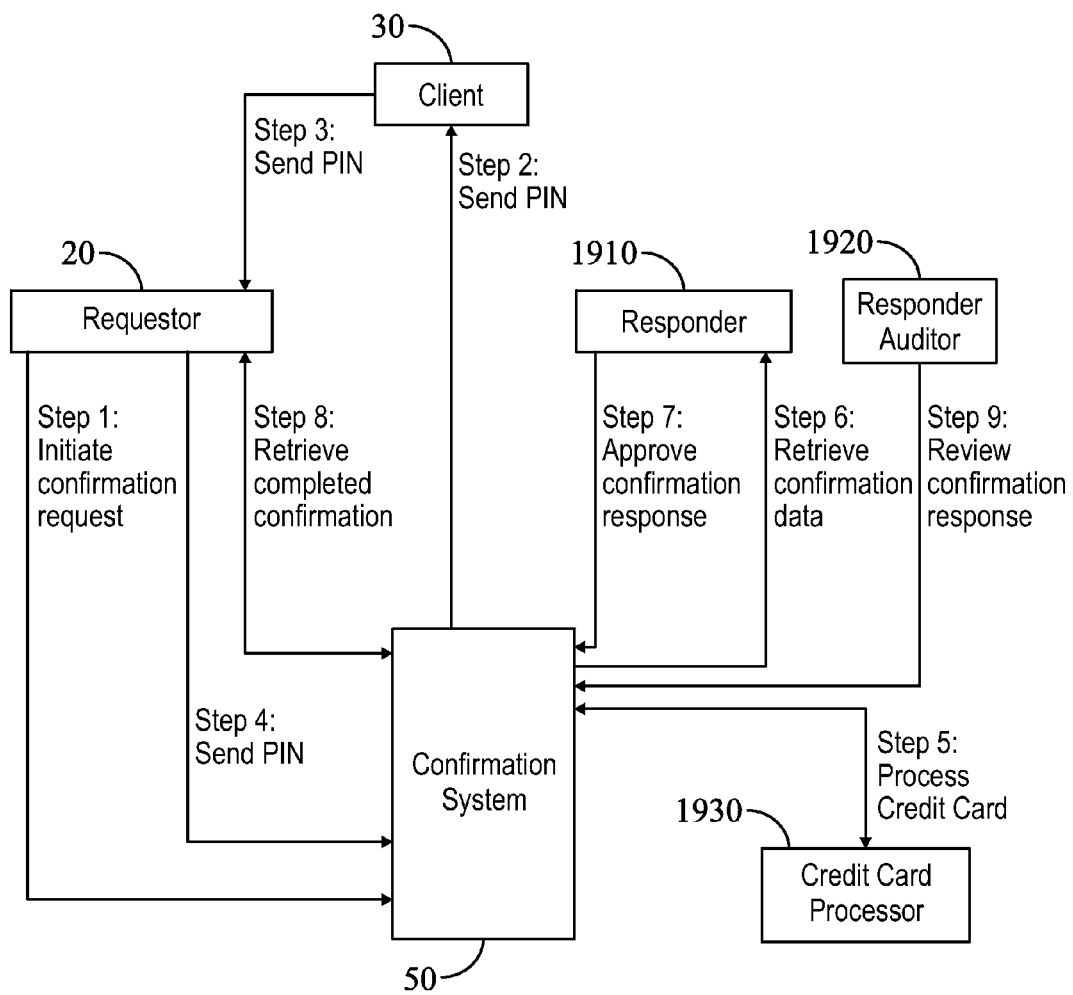
FIG. 22 is a block diagram of another embodiment of a confirmation system and method in which data is pulled from a responder after a personal identification number (PIN) is assigned to the client by the confirmation system.

FIG. 22 is a block diagram of another embodiment of a confirmation system in which data is pulled from a responder after a personal identification number (PIN) is assigned to the client by the confirmation system and used for authentication of the requestor. In step 1, the requestor 20 logs in to the confirmation system 50 with a username and password associated with the requestor 20 and inputs client account data to initiate a confirmation request. In step 2, the confirmation system 50 generates and sends a PIN to the client. The client 30 then provides the PIN to the requestor 20 in step 3 which may occur offline or via electronic communications, but occurs without action by the confirmation system 50. The requestor 20 inputs the PIN into the confirmation system 50 for validation and upon validation, the confirmation request is approved in step 4. In an optional step 5, the confirmation system 50 processes a credit card for payment by interacting with credit card processor 1930 via the public or private digital communications network connection (e.g., an Internet connection). The confirmation system 50 requests confirmation response data from responder 1910 and the responder 1910 sends confirmation response data back to the confirmation system 50 in step 6. In one embodiment, the response data edits the client account data in the confirmation system 50 and approves a confirmation response having edited client account data. In step 7, the responder 1910 then logs in to the confirmation system 50 and approves a confirmation response including the confirmation response data. In step 8, the requestor 20 accesses the confirmation system 50 with the username and password associated with the requester 20 and retrieves the completed confirmation. The confirmation system 50 may indicate to the requestor 20 that the completed confirmation is available via electronic mail. The requestor 20 can also download related reports. Alternatively, the confirmation system 50 may send the requestor 20 the completed confirmation and related reports by, for example, electronic mail in response to the responder 1910 completing the confirmation. In a final optional step 9, the responder auditor 1920 logs in to the confirmation system 50 to view the responder's response.

Figure 23:
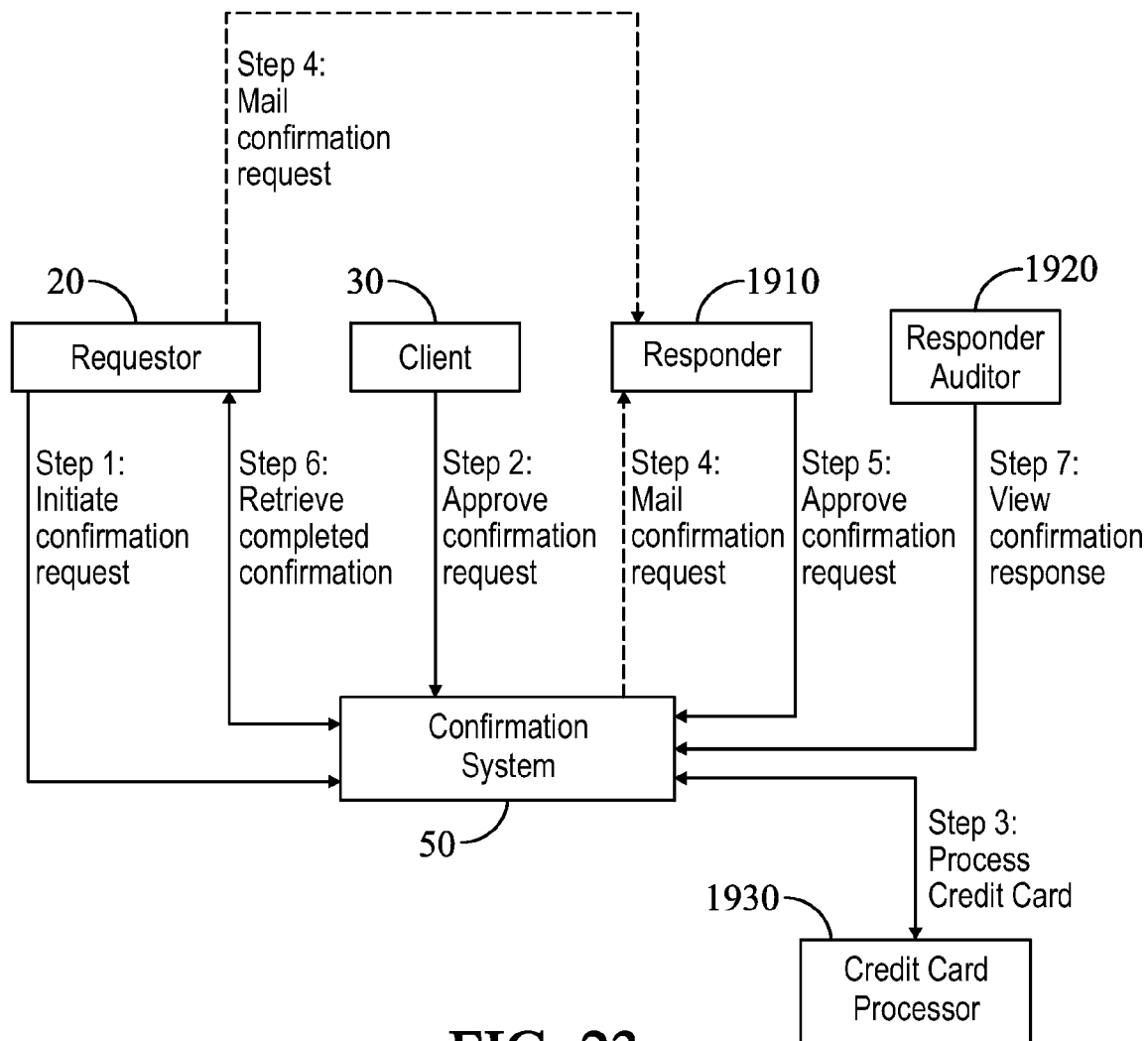
FIG. 23 is a block diagram of another embodiment of a confirmation system and method in which an electronic response is obtained after a paper confirmation request is made and an electronic signature is received from the client.

FIG. 23 is a block diagram of another embodiment of a confirmation system in which an electronic response is obtained after a paper confirmation request is made and an electronic signature is captured from the client. The requestor 20 logs in to the confirmation system 50 using a username and password associated with the requestor 20, inputs client account data, and initiates a request for confirmation in step 1. In step 2, the client 30 logs in to the confirmation system 50 using a username and password associated with the client 30 and approves the confirmation request by signing using electronic signature capture. In an optional step 3, the confirmation system 50 processes a credit card for payment by interacting with credit card processor 1930 via the public or private digital communications network connection (e.g., an Internet connection). The credit card information may be provided by the requestor 20 or client 30. In step 4, either the confirmation system 50 or the requestor 20 mails the confirmation request to the responder 1910. The responder 1910 then logs in to the confirmation system 50, inputs client response data, and approves the confirmation response in step 5. In one embodiment, the response data edits the client account data in the confirmation system 50 and approves a confirmation response having edited client account data. In step 6, the requestor 20 accesses the confirmation system 50 with the username and password associated with the requester 20 and retrieves the completed confirmation. The confirmation system 50 may indicate to the requestor 20 that the completed confirmation is available via electronic mail. The requestor 20 can also download related reports. Alternatively, the confirmation system 50 may send the requestor 20 the completed confirmation and related reports by, for example, electronic mail in response to the responder 1910 completing the confirmation. In an optional step 7, the responder auditor 1920 logs in to view the responder's response.

Figure 24:
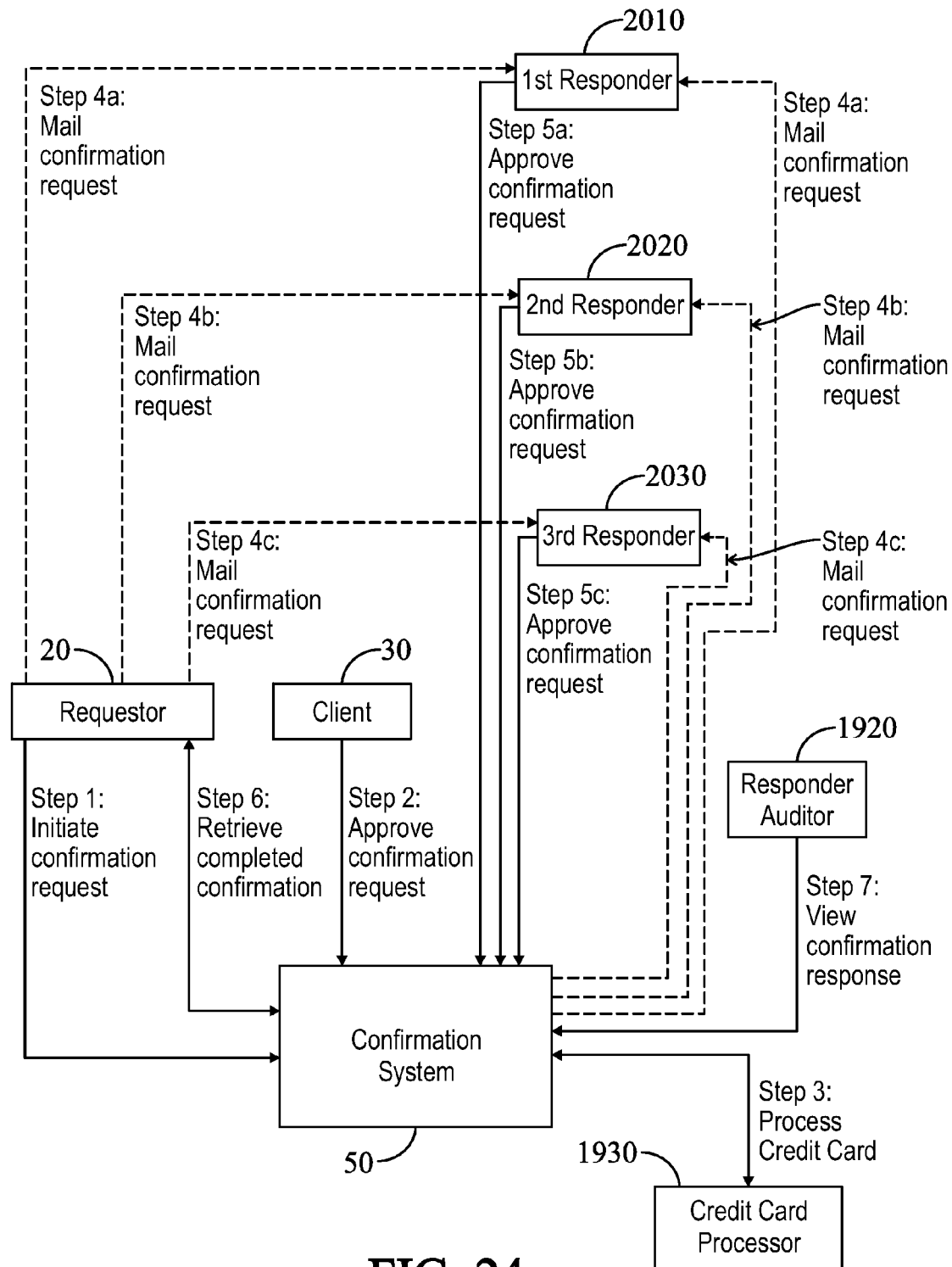
FIG. 24 is a block diagram of another embodiment of a confirmation system and method in which an electronic response is obtained from multiple responders at the same business after a paper confirmation request is made and an electronic signature is received from the client.

FIG. 24 illustrates a variation of the confirmation system and method shown in FIG. 23 in which responses are obtained from multiple responders (i.e., first responder 2010, second responder 2020, and third responder 2030) within the same business or company.

Figure 25:
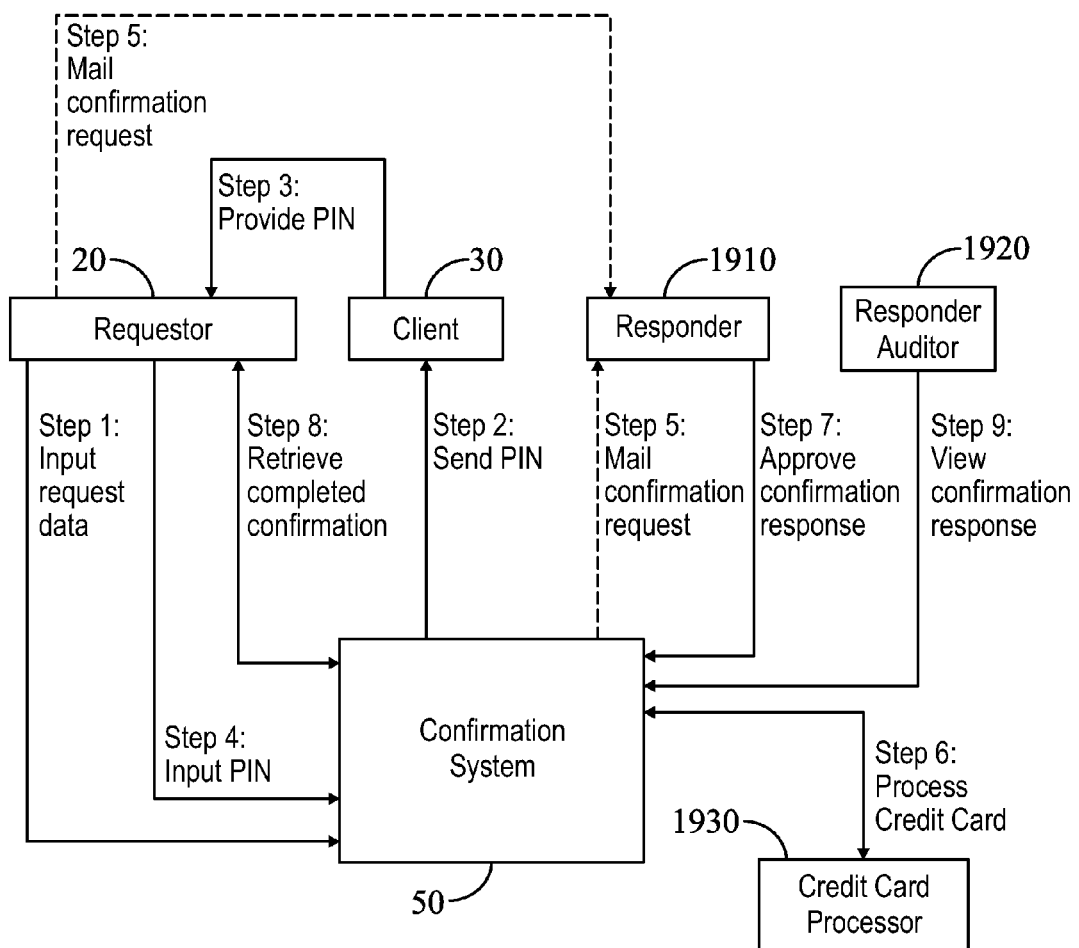
FIG. 25 is a block diagram of another embodiment of a confirmation system and method in which an electronic response is obtained after a paper confirmation request is made and a PIN is assigned to the client.

FIG. 25 is a block diagram of another embodiment of a confirmation system and method is illustrated in which an electronic response is obtained after a paper confirmation request is made and a PIN is assigned to the client by the confirmation system for authentication. In step 1, the requestor 20 logs in to the confirmation system 50 by providing a username and password associated with the requestor 20 through an electronic communications network (e.g., a connection to the Internet) and inputs client account data. At step 2, the confirmation system 50 generates and sends a PIN to the client 30. The client 30 provides the PIN to the requestor at step 3 which may occur offline or via electronic communications, but occurs without action by the confirmation system 50. The requestor inputs the PIN into the confirmation system 50 for validation and upon validation, the confirmation request is approved at step 4. In step 5, either the confirmation system 50 or the requestor 20 mails the confirmation request to the responder 1910. In an optional step 6, the confirmation system 50 processes a credit card for payment by interacting with credit card processor 1930 via the public or private digital communications network connection (e.g., an Internet connection). The credit card information may be provided by the requestor 20 or client 30. At step 7, the responder 1910 logs in to the confirmation system 50, inputs confirmation response data, and approves the confirmation response. In one embodiment, the response data edits the client account data in the confirmation system 50 and approves a confirmation response having edited client account data. In step 8, the requestor 20 accesses the confirmation system 50 with the username and password associated with the requester 20 and retrieves the completed confirmation. The confirmation system 50 may indicate to the requestor 20 that the completed confirmation is available via electronic mail. The requestor 20 can also download related reports. Alternatively, the confirmation system 50 may send the requestor 20 the completed confirmation and related reports by, for example, electronic mail in response to the responder 1910 completing the confirmation. In an optional step 9, the responder auditor 1920 logs in to view the responder's response.

Figure 26:
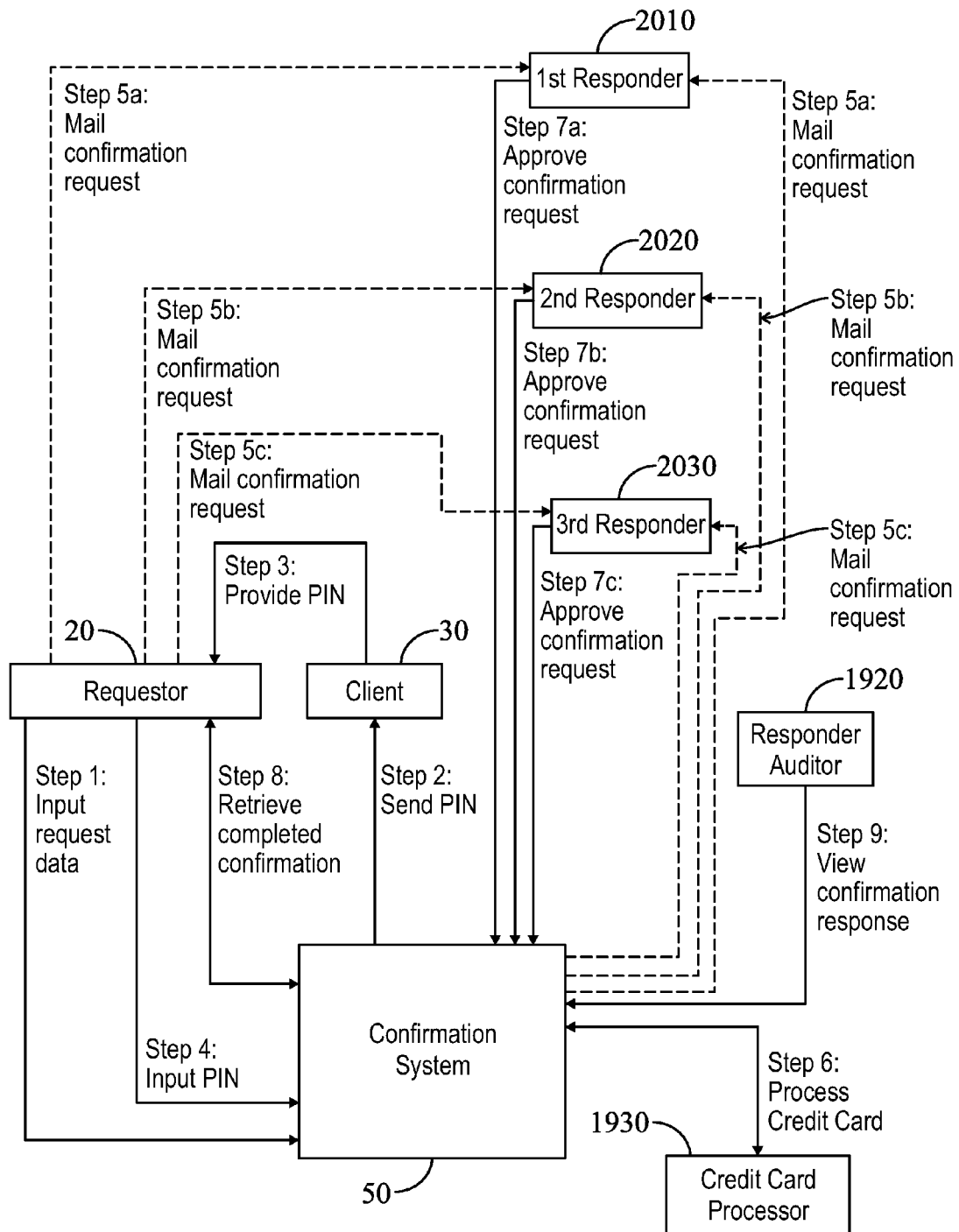
FIG. 26 is a block diagram of another embodiment of a confirmation system and method in which an electronic response is obtained from multiple responders at the same business after a paper confirmation request is made and a PIN is assigned to the client.

FIG. 26 illustrates a variation of the confirmation system and method shown in FIG. 25 in which responses are obtained from multiple responders (i.e., first responder 2010, second responder 2020, and third responder 2030) within the same business or company.

Figure 27:
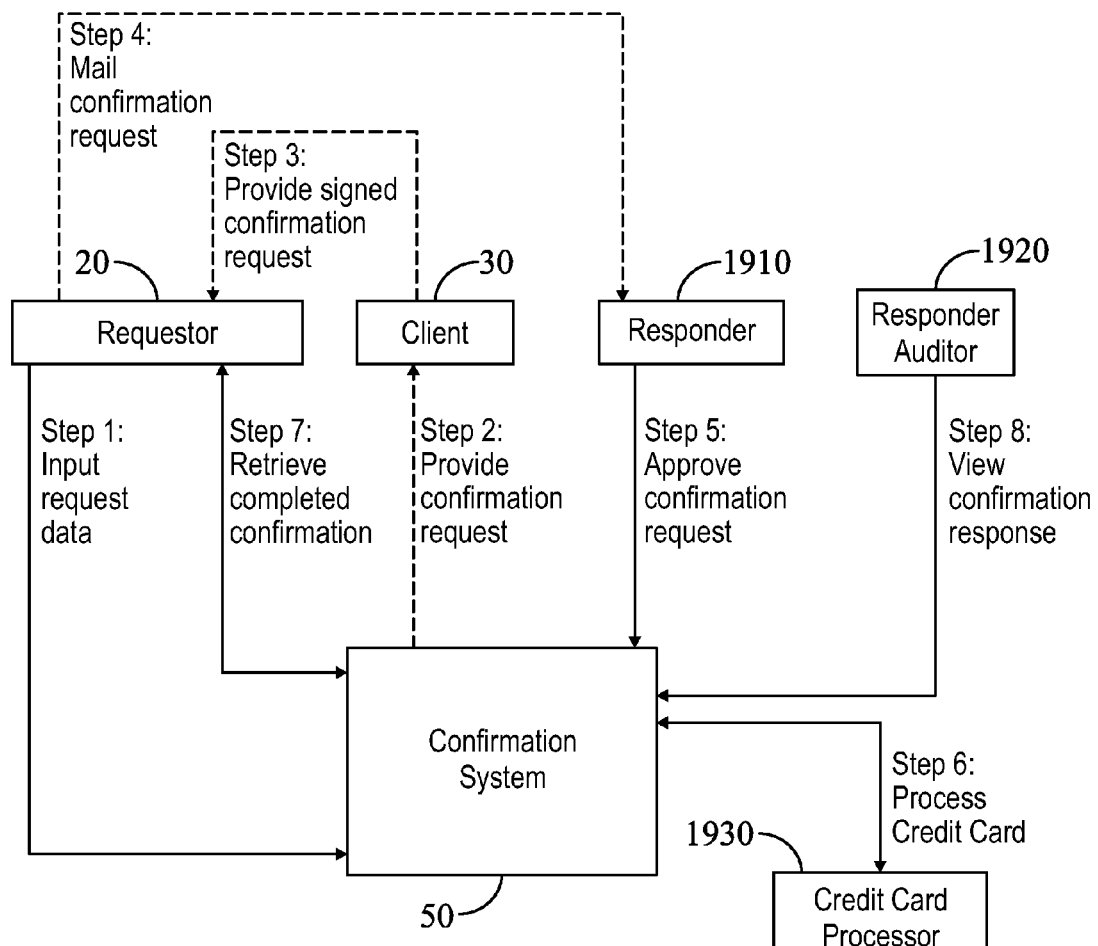
FIG. 27 is a block diagram of another embodiment of a confirmation system and method in which an electronic response is obtained after a paper confirmation request is made and the client signs the paper request.

FIG. 27 is a block diagram of another embodiment of a confirmation system in which an electronic response is obtained after a paper confirmation request is made and the client signs the paper request. In step 1, the requestor 20 logs in to the confirmation system 50 by providing a username and password associated with the requestor 20 through an electronic communications network (e.g., a connection to the Internet) and inputs client account data to initiate a confirmation request client account data. At step 2, the confirmation system 50 provides a paper confirmation request to the client 30 for signing. The client 30 can print the confirmation request by accessing the confirmation system 50, or the confirmation system 50 can mail a paper copy of the confirmation request to the client 30. The client 30 signs the paper confirmation request at step 3 and provides (e.g., mails) the signed request to the requestor 20. The requestor 20 then mails the confirmation request to the responder 1910 at step 4. Upon receipt of the request, the responder 1910 logs in to the confirmation system 50, inputs confirmation response data, and approves the confirmation response at step 5. In one embodiment, the response data edits the client account data in the confirmation system 50 and approves a confirmation response having edited client account data. In an optional step 6, the confirmation system 50 processes a credit card for payment by interacting with credit card processor 1930 via the public or private digital communications network connection (e.g., an Internet connection). The credit card information may be provided by the requestor 20 or client 30. In step 7, the requestor 20 accesses the confirmation system 50 with the username and password associated with the requester 20 and retrieves the completed confirmation. The confirmation system 50 may indicate to the requestor 20 that the completed confirmation is available via electronic mail. The requestor 20 can also download related reports. Alternatively, the confirmation system 50 may send the requestor 20 the completed confirmation and related reports by, for example, electronic mail in response to the responder 1910 completing the confirmation. In an optional step 8, the responder auditor 1920 logs in to view the responder's response.

Figure 28:
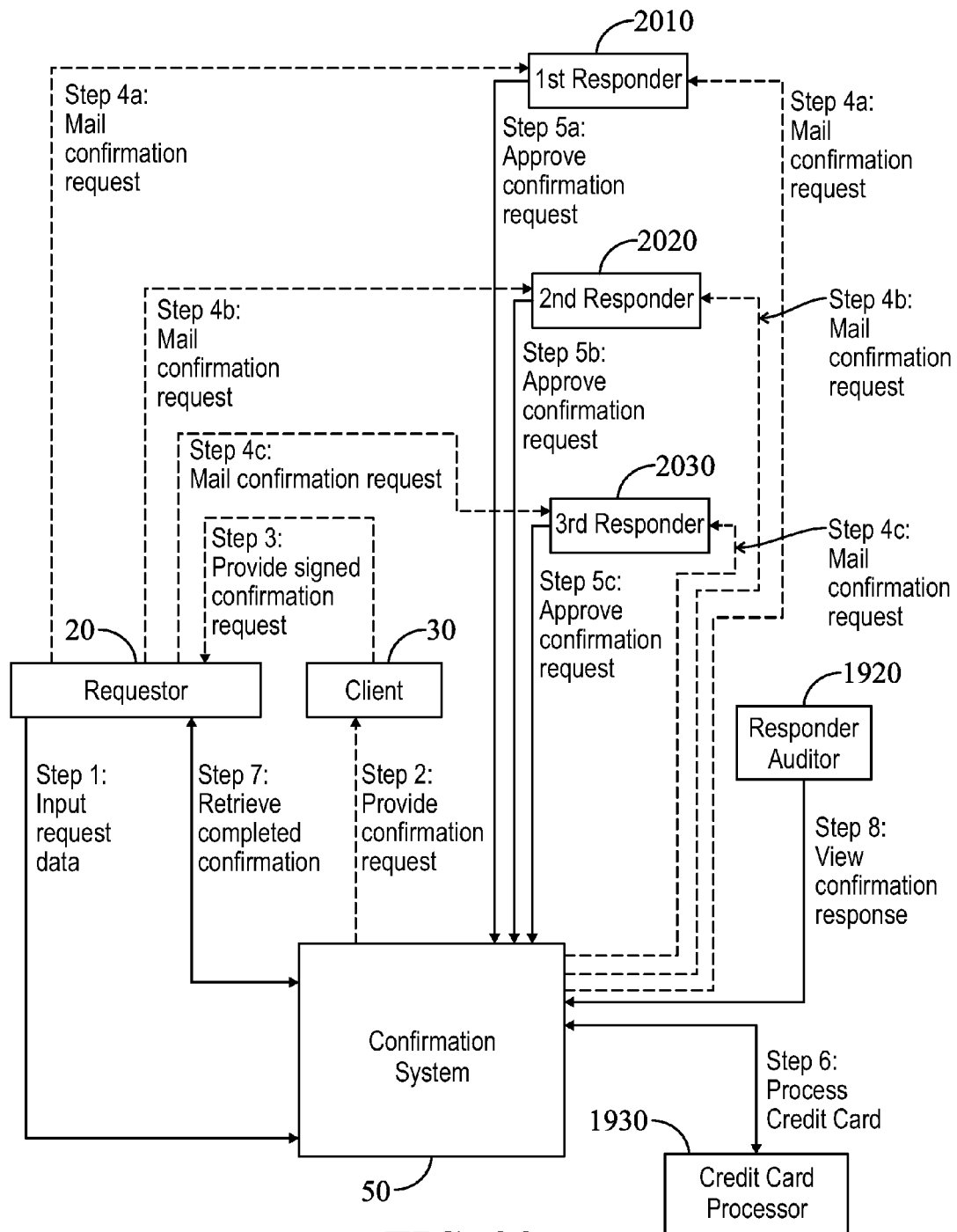
FIG. 28 is a block diagram of another embodiment of a confirmation system and method in which an electronic response is obtained from multiple responders at the same business after a paper confirmation request is made and the client signs the paper request.

FIG. 28 illustrates a variation of the confirmation system and method shown in FIG. 27 in which responses are obtained from multiple responders (i.e., first responder 2010, second responder 2020, and third responder 2030) within the same business or company.

A computer or computing device such as described herein has one or more processors or processing units, system memory, and some form of computer readable media. By way of example and not limitation, computer readable media comprise computer storage media and communication media. Computer storage media include volatile and nonvolatile, removable and non-removable media implemented in any method or technology for storage of information such as computer readable instructions, data structures, program modules or other data. Communication media typically embody computer readable instructions, data structures, program modules, or other data in a modulated data signal such as a carrier wave or other transport mechanism and include any information delivery media. Combinations of any of the above are also included within the scope of computer readable media.

The computer or computing device may operate in a networked environment using logical connections to one or more remote computers, such as a remote computer. Although described in connection with an exemplary computing system environment, embodiments of the invention are operational with numerous other general purpose or special purpose computing system environments or configurations. The computing system environment is not intended to suggest any limitation as to the scope of use or functionality of any aspect of the invention. Moreover, the computing system environment should not be interpreted as having any dependency or requirement relating to any one or combination of components illustrated in the exemplary operating environment. Examples of well known computing systems, environments, and/or configurations that may be suitable for use with aspects of the invention include, but are not limited to, personal computers, server computers, hand-held or laptop devices, multiprocessor systems, microprocessor-based systems, set top boxes, programmable consumer electronics, mobile telephones, network PCs, minicomputers, interactive video game consoles, mainframe computers, distributed computing environments that include any of the above systems or devices, and the like.

Embodiments of the invention may be described in the general context of computer-executable instructions, such as program modules, executed by one or more computers or other devices. The computer-executable instructions may be organized into one or more computer-executable components or modules. Generally, program modules include, but are not limited to, routines, programs, objects, components, and data structures that perform particular tasks or implement particular abstract data types. Aspects of the invention may be implemented with any number and organization of such components or modules. For example, aspects of the invention are not limited to the specific computer-executable instructions or the specific components or modules illustrated in the figures and described herein. Other embodiments of the invention may include different computer-executable instructions or components having more or less functionality than illustrated and described herein. Aspects of the invention may also be practiced in distributed computing environments where tasks are performed by remote processing devices that are linked through a communications network (e.g., a local area network and/or the Internet). In a distributed computing environment, program modules may be located in both local and remote computer readable storage media including memory storage devices.

The order of execution or performance of the operations in embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

When introducing elements of aspects of the invention or the embodiments thereof, the articles "a," "an," "the," and "said" are intended to mean that there are one or more of the elements. The terms "comprising," "including," and "having" are intended to be inclusive and mean that there may be additional elements other than the listed elements.

Having described aspects of the invention in detail, it will be apparent that modifications and variations are possible without departing from the scope of aspects of the invention as defined in the appended claims. As various changes could be made in the above constructions, products, and methods without departing from the scope of aspects of the invention, it is intended that all matter contained in the above description and shown in the accompanying drawings shall be interpreted as illustrative and not in a limiting sense.

It will be understood by those of skill in the art that information and signals may be represented using any of a variety of different technologies and techniques (e.g., data, instructions, commands, information, signals, bits, symbols, and chips may be represented by voltages, currents, electromagnetic waves, magnetic fields or particles, optical fields or particles, or any combination thereof). Likewise, the various illustrative logical blocks, modules, circuits, and algorithm steps described herein may be implemented as electronic hardware, computer software, or combinations of both, depending on the application and functionality. Moreover, the various logical blocks, modules, circuits, and controllers described herein may be implemented or performed with a general purpose processor (e.g., microprocessor, conventional processor, controller, microcontroller, state machine or combination of computing devices), a digital signal processor ("DSP"), an application specific integrated circuit ("ASIC"), a field programmable gate array ("FPGA") or other programmable logic device, discrete gate or transistor logic, discrete hardware components, or any combination thereof designed to perform the functions described herein. Similarly, steps of a method or process described herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. Although embodiments of the present invention have been described in detail, it will be understood by those skilled in the art that various modifications can be made therein without departing from the spirit and scope of the invention as set forth in the appended claims.

Thus, although there have been described particular embodiments of the present invention of a new and useful Systems and Methods for Obtaining Automated Third-Party Audit Confirmations Including Client Physical Signatures, PIN Access, and Multiple Responders, it is not intended that such references be construed as limitations upon the scope of this invention except as set forth in the following claims.

What is claimed is:

1. A method of obtaining a confirmation of client account data associated with a client from at least one responder comprising the steps of:
   receiving, via a communications network, client account data from a computer associated with a requestor at a computer of the confirmation system;
   storing the received client account data in a computer database of the confirmation system;
   receiving authorization to request confirmation of the client account data at the confirmation system via the communications network;
   receiving response data via the communications network at the confirmation system from a computer associated with at least one responder, wherein the response data approves the client account data;
   generating a completed confirmation as a function of the received response data; and
   providing the completed confirmation to the computer associated with the requestor.

2. The method of claim 1, wherein receiving authorization to request confirmation of the client account data comprises receiving a captured electronic signature at the computer associated with the confirmation system from a computer associated with the client via the communications network.

3. The method of claim 1, wherein receiving response data via the communications network from the computer associated with the responder comprises:
   providing credentials associated with the client from the database of the confirmation system to the computer of the responder via the communications network;
   retrieving, via the communications network, the response data from the computer associated with the responder; and
   storing the retrieved response data in the database of the confirmation system.

4. The method of claim 1, wherein:
   receiving authorization to request confirmation of the client account data comprises receiving a captured electronic signature at the computer associated with the confirmation system from a computer associated with the client via the communications network; and
   receiving response data via the communications network from the computer associated with the responder comprises:
      providing the captured electronic signature associated with the client from the database of the confirmation system to the computer of the responder via the communications network;

retrieving, via the communications network, the response data from the computer associated with the responder; and storing the retrieved response data in the database of the confirmation system.

5. The method of claim 1, further comprising providing a confirmation request from a computer of the confirmation system to the computer of the at least one responder via the communications network in response to receiving the authorization.

6. The method of claim 1, further comprising:
printing a paper confirmation request at the confirmation system; and
mailing the printed paper confirmation request from the confirmation system to the client, wherein the client signs the printed confirmation request and forwards the signed confirmation request to the responder.

7. The method of claim 1, further comprising:
providing a confirmation request from the computer of the confirmation system to the computer associated with the client via the communications network in a printable format, wherein the computer associated with the client prints a paper confirmation request, the client signs the confirmations request, and the client forwards the printed signed confirmation request to the responder.

8. The method of claim 1, further comprising:
printing a paper confirmation request at the confirmation system; and
mailing the printed paper confirmation request from the confirmation system to the client, wherein the client signs the printed confirmation request;
receiving the signed printed confirmation request at the confirmation system from the client; and
forwarding the signed printed confirmation request from the confirmation system to the responder.

9. The method of claim 1, further comprising:
providing a confirmation request from the computer of the confirmation system to the computer associated with the client via the communications network in a printable format, wherein the computer associated with the client prints a paper confirmation request and the client signs the confirmations request;
receiving the signed printed confirmation request at the confirmation system from the client; and
forwarding the signed printed confirmation request from the confirmation system to the responder.

10. The method of claim 1, further comprising:
sending a notification of the confirmation request to the computer of the responder via the communications network from the confirmation system;
receiving a username and password associated with the responder from the computer associated with the responder via the communications network;
authenticating the requestor by comparing the received username and password with a username and password stored in the database of the confirmation system and associated with the responder; and
providing access to the confirmation request to the responder in response to comparing the received username and password to the stored username and password.

11. A computer readable storage media having computer executable instruction modules operable to obtain an electronic confirmation of client account data associated with a client from at least one responder by performing the steps of:
receiving, via a communications network, client account data from a computer associated with a requestor at a computer of a confirmation system;
storing the received client account data in a computer database of the confirmation system;
receiving authorization to request confirmation of the client account data at the confirmation system via the communications network;
receiving response data via the communications network at the confirmation system from a computer associated with at least one responder, wherein the response data approves the client account data;
generating a completed confirmation as a function of the received response data; and
providing the completed confirmation to the computer associated with the requestor.

12. The computer readable storage media of claim 11, wherein receiving authorization to request confirmation of the client account data comprises receiving a captured electronic signature at the computer associated with the confirmation system from a computer associated with the client via the communications network.

13. The computer readable storage media of claim 11, wherein receiving response data via the communications network from the computer associated with the responder comprises:
providing credentials associated with the client from the database of the confirmation system to the computer of the responder via the communications network;
retrieving, via the communications network, the response data from the computer associated with the responder; and
storing the retrieved response data in the database of the confirmation system.

14. The computer readable storage media of claim 11, wherein:
receiving authorization to request confirmation of the client account data comprises receiving a captured electronic signature at the computer associated with the confirmation system from a computer associated with the client via the communications network; and
receiving response data via the communications network from the computer associated with the responder comprises:
providing the captured electronic signature associated with the client from the database of the confirmation system to the computer of the responder via the communications network;
retrieving, via the communications network, the response data from the computer associated with the responder; and
storing the retrieved response data in the database of the confirmation system.

15. The computer readable storage media of claim 11, wherein the computer executable instruction modules are further operable to perform the steps of:
providing a confirmation request from a computer of the confirmation system to the computer of the at least one responder via the communications network in response to receiving the authorization.

16. The computer readable storage media of claim 11, wherein the computer executable instruction modules are further operable to perform the steps of:
printing a paper confirmation request at the confirmation system; and
mailing the printed paper confirmation request from the confirmation system to the client, wherein the client signs the printed confirmation request and forwards the signed confirmation request to the responder.

17. The computer readable storage media of claim 11, wherein the computer executable instruction modules are further operable to perform the steps of:
providing a confirmation request from the computer of the confirmation system to the computer associated with the client via the communications network in a printable format, wherein the computer associated with the client prints a paper confirmation request, the client signs the confirmations request, and the client forwards the printed signed confirmation request to the responder.

18. The computer readable storage media of claim 11, wherein the computer executable instruction modules are further operable to perform the steps of:
    printing a paper confirmation request at the confirmation system; and
    mailing the printed paper confirmation request from the confirmation system to the client, wherein the client signs the printed confirmation request;
    receiving the signed printed confirmation request at the confirmation system from the client; and
    forwarding the signed printed confirmation request from the confirmation system to the responder.

19. The computer readable storage media of claim 11, wherein the computer executable instruction modules are further operable to perform the steps of:
    providing a confirmation request from the computer of the confirmation system to the computer associated with the client via the communications network in a printable format, wherein the computer associated with the client prints a paper confirmation request and the client signs the confirmations request;
    receiving the signed printed confirmation request at the confirmation system from the client; and
    forwarding the signed printed confirmation request from the confirmation system to the responder.

20. The computer readable storage media of claim 11, wherein the computer executable instruction modules are further operable to perform the steps of:
    sending a notification of the confirmation request to the computer of the responder via the communications network from the confirmation system;
    receiving a username and password associated with the responder from the computer associated with the responder via the communications network;
    authenticating the requestor by comparing the received username and password with a username and password stored in the database of the confirmation system and associated with the responder; and
    providing access to the confirmation request to the responder in response to comparing the received username and password to the stored username and password.

* * * * *